United States Patent
Choi et al.

(10) Patent No.: US 11,461,171 B2
(45) Date of Patent: Oct. 4, 2022

(54) MEMORY SYSTEM AND METHOD OF OPERATING THE SAME

(71) Applicant: SK hynix Inc., Gyeonggi-do (KR)

(72) Inventors: Won Jae Choi, Gyeonggi-do (KR); Se Chun Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/190,707

(22) Filed: Mar. 3, 2021

(65) Prior Publication Data

US 2022/0066870 A1    Mar. 3, 2022

(30) Foreign Application Priority Data

Aug. 28, 2020 (KR) .................. 10-2020-0109099

(51) Int. Cl.
*G06F 11/10* (2006.01)
*G06F 3/06* (2006.01)

(52) U.S. Cl.
CPC ........ *G06F 11/1068* (2013.01); *G06F 3/0619* (2013.01); *G06F 3/0659* (2013.01); *G06F 3/0673* (2013.01)

(58) Field of Classification Search
CPC .... G06F 3/0619; G06F 3/0659; G06F 3/0673; G06F 11/1048; G06F 11/1068
See application file for complete search history.

(56) References Cited

U.S. PATENT DOCUMENTS

| 9,269,451 B2 | 2/2016 | Ellis |
| 9,595,342 B2 | 3/2017 | Pang et al. |
| 2015/0242143 A1* | 8/2015 | Kim ..................... G11C 16/349 714/704 |

(Continued)

FOREIGN PATENT DOCUMENTS

| KR | 10-0512501 | 9/2005 |
| KR | 10-2014-0050145 | 4/2014 |

(Continued)

OTHER PUBLICATIONS

Cai et al., Flash Correct-and-Refresh: Retention-Aware Error Management for Increased Flash Memory Lifetime, 2012 IEEE 30th International Conference on Computer Design (ICCD), DOI: 10.1109/ICCD.2012.6378623, Sep. 30, 2012, IEEE, Montreal, Canada.

*Primary Examiner* — Shelly A Chase
(74) *Attorney, Agent, or Firm* — IP & T Group LLP

(57) ABSTRACT

The present technology relates to an electronic device. A memory system for increasing reliability of data includes a memory device including a plurality of pages, and a memory controller configured to correct an error in read data obtained by reading a selected page among the plurality of pages, and determine whether to perform a refresh operation on the selected page based on a number of error bits included in the read data. The memory controller comprises a normal read operation controller configured to control a read operation on the selected page and determine the number of error bits in the read data, an error correction performance component configured to correct the read data, and a data recovery controller configured to control the refresh operation on the selected page based on the number of error bits in the read data when the error in the read data is corrected.

23 Claims, 21 Drawing Sheets

(56) References Cited

U.S. PATENT DOCUMENTS

2016/0179613 A1* 6/2016 Suto .................... G06F 11/1048
714/773
2017/0177425 A1* 6/2017 Jei ....................... G06F 11/0751
2017/0371742 A1* 12/2017 Shim .................... G11C 16/26

FOREIGN PATENT DOCUMENTS

| KR | 10-2019-0054239 | 5/2019 |
| KR | 10-2019-0087180 | 7/2019 |
| KR | 10-2020-0132566 | 11/2020 |
| KR | 10-2020-0136173 | 12/2020 |

* cited by examiner

FIG. 6

| ERR_BIT_INF | OP_INF |
|---|---|
| ERR_BIT_INF < TH1 | – |
| TH1 ≤ ERR_BIT_INF < TH2 | REFRESH_OP |
| ERR_BIT_INF ≥ TH2 | RR_OP |

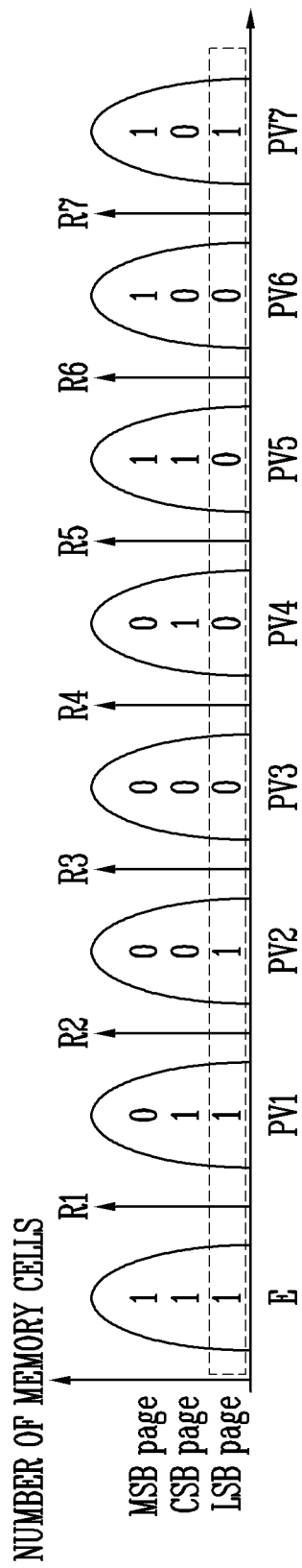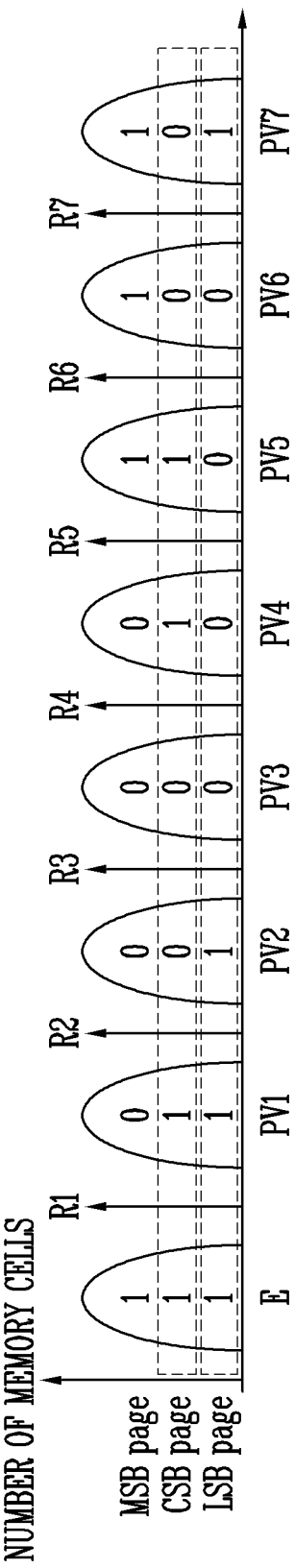

FIG. 11A

| REF_BIT_INF | OP_INF |
|---|---|
| REF_BIT_INF < TH3 | – |
| TH3 ≤ REF_BIT_INF < TH4 | REFRESH_OP |
| REF_BIT_INF ≥ TH4 | RR_OP |

FIG. 11B

| REF_BIT_INF | OP_INF |
|---|---|
| LSB_FAIL_BIT ≥ CSB_FAIL_BIT | REFRESH_OP |
| LSB_FAIL_BIT < CSB_FAIL_BIT | RR_OP |

FIG. 14

| REF_BIT_INF | OP_INF |
|---|---|
| REF_BIT_INF < TH5 | – |
| TH5 ≤ REF_BIT_INF < TH6 | REFRESH_OP |
| REF_BIT_INF ≥ TH6 | RR_OP |

MEMORY SYSTEM AND METHOD OF OPERATING THE SAME

CROSS-REFERENCE TO RELATED APPLICATION

The present application claims priority under 35 U.S.C. § 119(a) to Korean patent application number 10-2020-0109099 filed on Aug. 28, 2020, in the Korean Intellectual Property Office, the entire disclosure of which is incorporated by reference herein.

BACKGROUND

1. Technical Field

The present disclosure relates to an electronic device, and more particularly, to a memory system and a method of operating the same.

2. Related Art

A storage device (memory system) stores data under control of a host device such as a computer, a smart phone, or a smart pad. The storage device may be of the type that stores data in a magnetic disk such as a hard disk drive (HDD), or of a type that stores data in a semiconductor memory such as a solid state drive (SSD), or a memory card, in particular, a non-volatile memory.

The storage device may include a memory device in which data is stored and a memory controller that stores data in the memory device. Generally, there are two types of memory devices: volatile memory devices and non-volatile memory devices. Examples of non-volatile memory devices include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM) and the like.

SUMMARY

An embodiment of the present disclosure provides a memory system and a method of controlling a memory device to efficiently improve data deterioration and increase reliability of data.

A memory system according to an embodiment of the present disclosure may include a memory device including a plurality of pages, and a memory controller configured to correct an error in read data obtained by reading a selected page among the plurality of pages, and determine whether to perform a refresh operation on the selected page based on a number of error bits in the read data. The memory controller may comprise a normal read operation controller configured to control a read operation on the selected page and determine the number of error bits in the read data, an error correction performance component configured to correct the read data, and a data recovery controller configured to control the refresh operation on the selected page based on the number of error bits in the read data when the error in the read data is corrected.

A method of operating a memory system, which comprises a memory device including a plurality of pages, and a memory controller configured to correct an error in read data obtained by reading a selected page among the plurality of pages, and determine whether to perform a refresh operation on the selected page based on a number of error bits in the read data, may include reading the selected page to obtain the read data, correcting the error in the read data, determining the number of error bits in the read data when correction of the error in the read data is passed, and controlling the refresh operation on the selected page based on the number of error bits in the read data.

A memory controller, which controls a memory device including a plurality of pages, according to an embodiment of the present disclosure may include a normal read operation controller configured to control a read operation on a selected page among the plurality of pages and determine a number of error bits in read data read from the memory device during the read operation, an error correction performance component configured to correct the error in the read data, and a data recovery controller configured to control a refresh operation on the selected page based on the number of error bits in the read data when the error in the read data is corrected.

An operating method of a controller may include providing read data, which has been successfully read from a page, to a host and controlling, based on a number of error bits detected in the read data, a memory device to selectively perform a refresh operation on the page or a read reclaim operation on a block including the page.

An operating method of a controller may include providing first data, which has been successfully read from a physical page, to a host, controlling a memory device to read second data from a least significant bit page corresponding to the physical page and controlling, based on difference between the first and second data, the memory device to selectively perform a refresh operation on the physical page or a read reclaim operation on a block including the physical page.

An operating method of a controller may include providing read data, which has been successfully read from a page, to a host, controlling a memory device to read block data from two or more pages in a block including the page, detecting a number of error bits in the block data and controlling, based on the number of error bits detected in the block data, the memory device to selectively perform a refresh operation on the page or a read reclaim operation on the block.

According to the present technology, when error correction is passed, reliability of data may be increased by determining whether to perform a refresh operation or a read reclaim operation based on the number of error bits included in a read data.

BRIEF DESCRIPTION OF THE DRAWINGS

FIG. 6 is a diagram illustrating an operation performed based on the number of error bits in the error correction decoded data in FIG. 5.

FIGS. 10A and 10B are diagrams illustrating a logical page read by a page read command of FIG. 9.

FIGS. 11A and 11B are diagrams illustrating an operation performed based on the number of error bits in the data read according to the page read command of FIG. 9.

FIG. 14 is a diagram illustrating an operation performed based on the number of error bits in the data read according to the block read command of FIG. 12.

DETAILED DESCRIPTION

Specific structural and functional description herein is provided only to describe embodiments of the present disclosure. The invention, however, may be implemented in various forms and carried out in various ways; thus, the invention is not limited to any of the disclosed embodiments. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiment(s).

Embodiments of the present disclosure are described in detail below with reference to the accompanying drawings, so that those skilled in the art to which the present disclosure pertains may practice and easily carry out the present invention.

Figure 1:
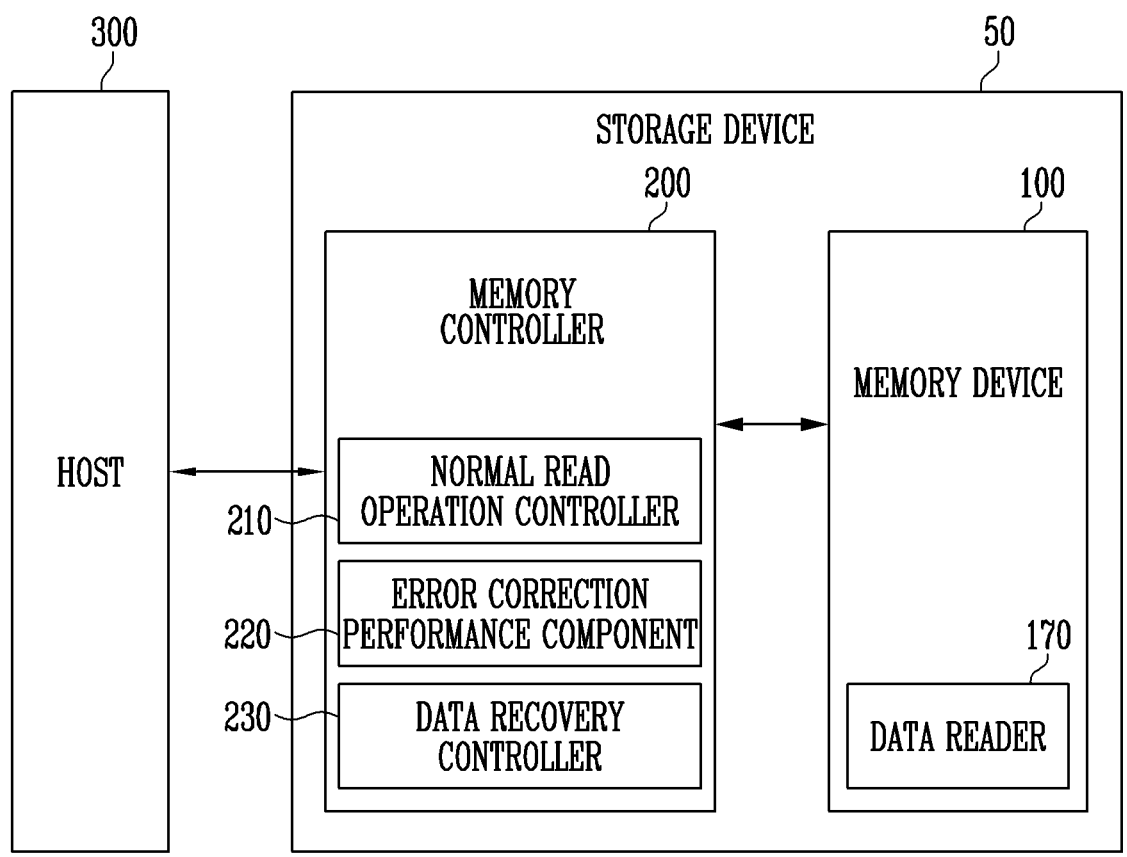
FIG. 1 is a block diagram illustrating a storage device.

FIG. 1 is a block diagram illustrating a storage device.

Referring to FIG. 1, the storage device 50 may include a memory device 100 and a memory controller 200.

The storage device 50 may store data under control of a host 300 such as a cellular phone, a smartphone, an MP3 player, a laptop computer, a desktop computer, a game player, a TV, a tablet PC, or an in-vehicle infotainment system.

The storage device 50 may be manufactured or configured as any of various types of storage devices according to a host interface that is a communication method with the host 300. For example, the storage device 50 may be configured as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and/or a memory stick.

The storage device 50 may be manufactured as any of various types of packages. For example, the storage device 50 may be manufactured as a package on package (POP), a system in package (SIP), a system on chip (SOC), a multi-chip package (MCP), a chip on board (COB), a wafer-level fabricated package (WFP), and/or a wafer-level stack package (WSP).

The memory device 100 may store data. The memory device 100 operates in response to control of the memory controller 200. The memory device 100 may include a memory cell array including a plurality of memory cells storing the data. The memory cell array may include a plurality of memory blocks. Each of the memory blocks may include a plurality of memory cells, which may configure a plurality of pages. In an embodiment, a page may be a unit for storing data in the memory device 100 or reading data stored in the memory device 100. The memory block may be a unit for erasing data.

In an embodiment, the memory device 100 may include a data reader 170. The data reader 170 may read data of a selected page in response to a read command received from the memory controller 200. The data reader 170 may output read data obtained by reading the data of the selected page to the memory controller 200.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, by way of example, it is assumed that the memory device 100 is a NAND flash memory.

The memory device 100 may be implemented as a two-dimensional array structure or a three-dimensional array structure. While aspects and features of the invention are described below in the context of a three-dimensional array structure memory device, the present invention is not limited to the three-dimensional array structure. The present disclosure may be applied not only to a flash memory device in which a charge storage layer is configured of a conductive floating gate (FG), but also to a charge trap flash (CTF) in which the charge storage layer is configured of an insulating film.

In an embodiment, the memory device 100 may operate in a single level cell (SLC) method in which one data bit is stored in one memory cell. Alternatively, the memory device 100 may operate in a method of storing at least two data bits in one memory cell. For example, the memory device 100 may operate in a multi-level cell (MLC) method of storing two data bits in one memory cell, a triple level cell (TLC) method of storing three data bits in one memory cell, or a quadruple level cell (QLC) method of storing four data bits in one memory cell.

The memory device 100 is configured to receive a command and an address from the memory controller 200 and access a region selected by the address in the memory cell array. That is, the memory device 100 may perform an operation corresponding to the command on the region selected by the address. For example, the memory device 100 may perform a write operation (program operation), a read operation, or an erase operation according to the received command. For example, when a program command is received, the memory device 100 may program data to the region selected by the address. When a read command is received, the memory device 100 may read data from the region selected by the address. When an erase command is received, the memory device 100 may erase data stored in the region selected by the address.

In an embodiment, the memory controller 200 may include a normal read operation controller 210, an error correction performance component 220, and a data recovery controller 230.

In an embodiment, the normal read operation controller 210 may control the memory device 100 so that the memory device 100 performs a normal read operation. Here, the normal read operation may be performed using a default read voltage. The default read voltage may be determined through a test during a production process of the memory device 100, and may distinguish between an erase state and program states.

The normal read operation controller 210 may provide a read command and an address for performing the normal read operation to the memory device 100 and obtain data read from the memory device 100. When the read data is obtained from the memory device 100, the normal read operation controller 210 may provide the read data to the error correction performance component 220 that performs an error correction decoding operation and reports the result to the normal read operation controller 210. Based on that result, the normal read operation controller 210 may determine whether a data recovery operation is to be performed, and may provide the result of that determination to the data recovery controller 230.

In an embodiment, the error correction performance component 220 may correct error(s) in the read data. The error correction decoding operation performed by the error correction performance component 220 may detect and correct error bit(s) in the read data. Here, the maximum number of error bits that may be corrected by the error correction performance component 220 may be determined in advance.

For example, when the number of error bits in the read data exceeds the maximum number of correctable error bits, the error correction performance component 220 may determine that the error correction decoding operation failed. Alternatively, when the number of error bits in the read data is equal to or less than the maximum number of correctable error bits, the error correction performance component 220 may correct such error(s) and determine that the error correction decoding operation passed. When the error correction decoding operation passed, original data may be recovered. Conversely, when the error correction decoding operation failed, the original data may not be recovered.

In an embodiment, the data recovery controller 230 may selectively perform a data recovery operation according to a result of the error correction decoding operation of the normal read operation.

When the original data cannot be recovered via error correction decoding, it may mean that data stored in the storage device 50 is not reliable. Therefore, the memory controller 200 may perform various data recovery operations in order to recover the original data. Typically, the data recovery operations may include a read retry operation and an e-boost operation.

The read retry operation may include reading again data stored in a page in which the read operation failed, using set read voltages. In an embodiment, the error correction performance component 220 may perform the error correction decoding operation on the read data according to the read retry operation. When the original data cannot be recovered even by the read retry operation, the e-boost operation may be performed.

The e-boost operation may include determining an optimum read voltage for reading the data stored in the page in which the read operation failed and performing the read operation again using the determined optimum read voltage. When performing the e-boost operation, the data recovery controller 230 may perform a plurality of read operations to find the optimum read voltage, and may determine the optimum read voltage using data obtained by the plurality of read operations. The data recovery controller 230 may read the data stored in the failed page using the determined optimum read voltage.

It is noted that, while the read retry operation and the e-boost operation are described as examples of data recovery operations, any of various other data recovery operations may be used instead. Combinations of different data recovery operations may also be used. In this case, one of the data recovery operations other than e-boost may be selected to be performed first; e-boost is usually performed last if it is performed at all.

However, recovery operations previously used to recover data such as the read retry operation or the e-boost operation have a problem in that many read operations are involved and data still may not be recovered.

Therefore, according to an embodiment of the present disclosure, even though the error correction decoding operation for the normal read operation passed, the data recovery controller 230 may perform a read reclaim operation or a refresh operation according to the number of error bits in the normal read operation, and thus reliability of data may be improved.

Details of the data recovery controller 230 performing the read reclaim operation or the refresh operation according to the number of error bits in the normal read operation are described in more detail below.

The memory controller 200 may control overall operation of the storage device 50.

When a power voltage is applied to the storage device 50, the memory controller 200 may execute firmware. When the memory device 100 is a flash memory device, the memory controller 200 may operate firmware such as a flash translation layer (FTL) for controlling communication between the host 300 and the memory device 100.

In an embodiment, the memory controller 200 may include firmware (not shown) that may receive data and a logical block address (LBA) from the host 300 and translate the LBA into a physical block address (PBA) indicating an address of memory cells included in the memory device 100 in which data is to be stored. In addition, the memory controller 200 may store a logical-physical address mapping table configuring a mapping relationship between the LBA and the PBA in a buffer memory.

The memory controller 200 may control the memory device 100 to perform the program operation, the read operation, the erase operation, or the like according to the request of the host 300. For example, when a program request is received from the host 300, the memory controller 200 may converts the program request into a program command, and may provide the program command, the PBA, and data to the memory device 100. When a read request is received from the host 300 together with the LBA, the memory controller 200 may change the read request into a read command, select a PBA corresponding to the LBA, and then provide the read command and the PBA to the memory device 100. When an erase request is received from the host 300 together with the LBA, the memory controller 200 may change the erase request into an erase command, select a PBA corresponding to the LBA, and then provide the erase command and the PBA to the memory device 100.

In an embodiment, the memory controller 200 may generate and transmit the program command, the address, and the data to the memory device 100 without the request from the host 300. For example, the memory controller 200 may provide the command, the address, and the data to the memory device 100 so as to perform background operations such as a program operation for wear leveling and a program operation for garbage collection.

In an embodiment, the storage device 50 may further include a buffer memory (not shown). The memory controller 200 may control data exchange between the host 300 and the buffer memory (not shown). Alternatively, the memory controller 200 may temporarily store system data for controlling the memory device 100 in the buffer memory. For example, the memory controller 200 may temporarily store data input from the host 300 in the buffer memory, and then transmit the data temporarily stored in the buffer memory to the memory device 100.

In various embodiments, the buffer memory may be used as an operation memory and a cache memory of the memory controller 200. The buffer memory may store codes or commands executed by the memory controller 200. Alternatively, the buffer memory may store data processed by the memory controller 200.

In an embodiment, the buffer memory may be implemented as a dynamic random access memory (DRAM) such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR), or Rambus dynamic random access memory (DRAM), or a static random access memory (SRAM).

In various embodiments, the buffer memory may be disposed externally to the storage device 50 and operably coupled thereto. In this case, one or more external volatile memory devices operably coupled to the storage device 50 may serve as the buffer memory.

In an embodiment, the memory controller 200 may control two or more memory devices. In this case, the memory controller 200 may control the memory devices according to an interleaving method in order to improve operation performance.

The host 300 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and/or a load reduced DIMM (LRDIMM).

Figure 2:
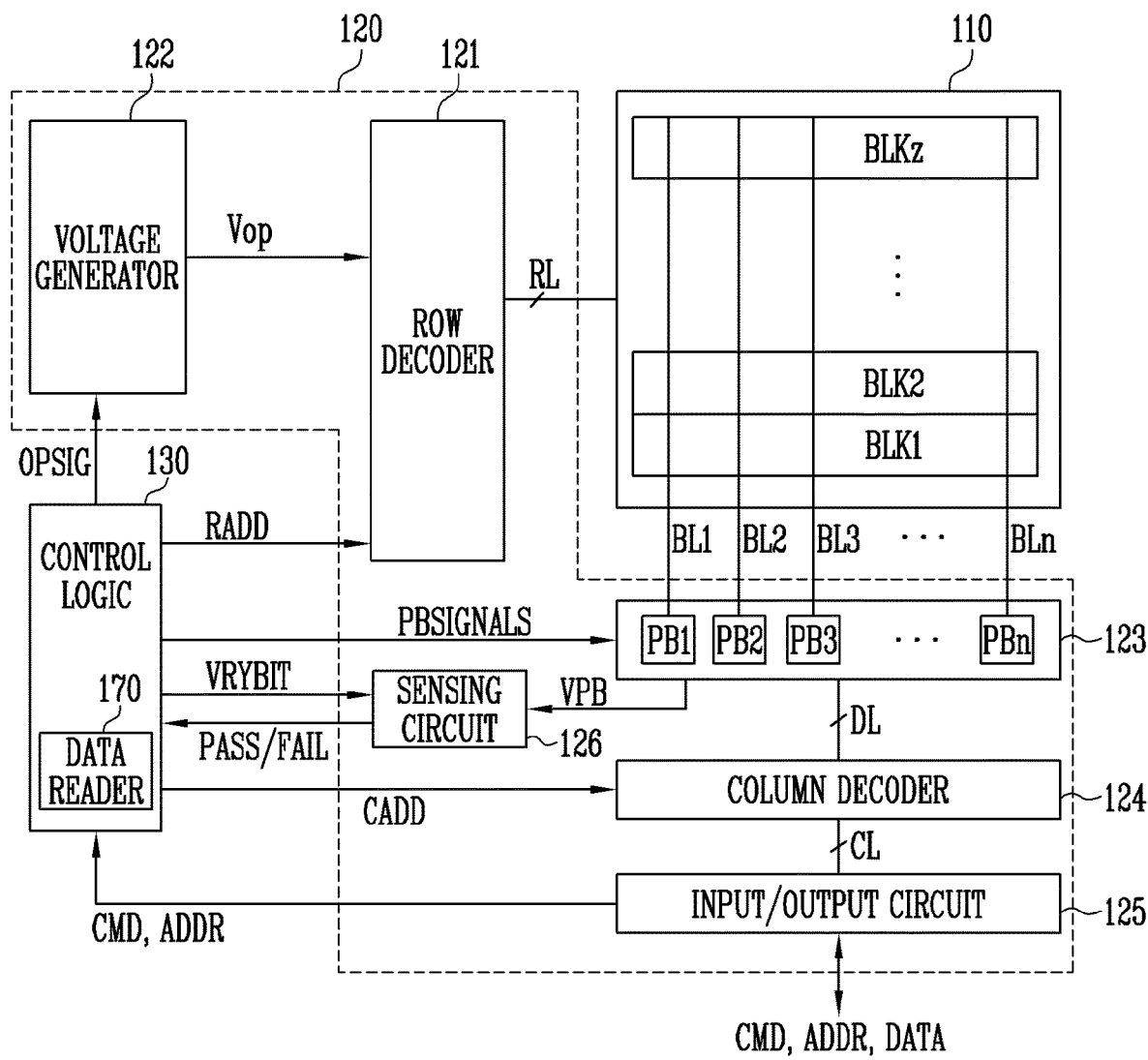
FIG. 2 is a diagram illustrating a structure of a memory device of FIG. 1.

FIG. 2 is a diagram illustrating a structure of the memory device of FIG. 1.

Referring to FIG. 2, the memory device 100 may include a memory cell array 110, a peripheral circuit 120, and control logic 130.

The memory cell array 110 includes a plurality of memory blocks BLK1 to BLKz, which are connected to a row decoder 121 through row lines RL. The plurality of memory blocks BLK1 to BLKz may be connected to the page buffer group 123 through bit lines BL1 to BLn. Each of the plurality of memory blocks BLK1 to BLKz includes a plurality of memory cells. In an embodiment, the plurality of memory cells are non-volatile memory cells. Memory cells connected to the same word line may be defined as one page. Therefore, one memory block may include a plurality of pages.

The row lines RL may include at least one source select line, a plurality of word lines, and at least one drain select line.

The peripheral circuit 120 may be configured to perform the program operation, the read operation, or the erase operation on a selected region of the memory cell array 110 under control of the control logic 130.

The peripheral circuit 120 may include a row decoder 121, a voltage generator 122, the page buffer group 123, a column decoder 124, an input/output circuit 125, and a sensing circuit 126.

The row decoder 121 is connected to the memory cell array 110 through the row lines RL. The row lines RL may include at least one source select line, a plurality of word lines, and at least one drain select line.

The row decoder 121 is configured to decode a row address RADD received from the control logic 130. The row decoder 121 selects at least one memory block among the memory blocks BLK1 to BLKz according to a decoded address. In addition, the row decoder 121 may select at least one word line of the selected memory block to apply the voltages generated by the voltage generator 122 to the at least one word line WL according to the decoded address.

The voltage generator 122 operates in response to the control of the control logic 130. The voltage generator 122 is configured to generate a plurality of voltages using an external power voltage supplied to the memory device 100. Specifically, the voltage generator 122 may generate various operation voltages Vop used for the program, read, and erase operations, in response to operation signal OPSIG.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages using the external power voltage or the internal power voltage.

For example, the voltage generator 122 may include a plurality of pumping capacitors that receive the internal power voltage, and may selectively activate the plurality of pumping capacitors to generate the plurality of voltages, in response to the control of the control logic 130.

The generated plurality of voltages may be supplied to the memory cell array 110 by the row decoder 121.

The page buffer group 123 includes first to n-th page buffers PB1 to PBn, which are connected to the memory cell array 110 through the first to n-th bit lines BL1 to BLn, respectively. The first to n-th page buffers PB1 to PBn operate in response to the control of the control logic 130. Specifically, the first to n-th page buffers PB1 to PBn may operate in response to page buffer control signals PBSIGNALS.

Specifically, during the program operation, when the program voltage is applied to the selected word line, the first to n-th page buffers PB1 to PBn may transfer data DATA received through the input/output circuit 125 to the selected memory cell through the first to n-th bit lines BL1 to BLn. The memory cells of the selected page are programmed according to the transferred data DATA. During the program verify operation, the first to n-th page buffers PB1 to PBn may read page data by sensing the voltage or the current received from the selected memory cells through the first to n-th bit lines BL1 to BLn.

During the read operation, the first to n-th page buffers PB1 to PBn read the data DATA from the memory cells of the selected page through the first to n-th bit lines BL1 to BLn, and outputs the read data DATA to the input/output circuit 125 under the control of the column decoder 124.

During the erase operation, the first to n-th page buffers PB1 to PBn may float the first to n-th bit lines BL1 to BLn or apply the erase voltage.

The column decoder 124 may transfer data between the input/output circuit 125 and the page buffer group 123 in response to a column address CADD. For example, the column decoder 124 may exchange data with the first to n-th page buffers PB1 to PBn through data lines DL, or may exchange data with the input/output circuit 125 through column lines CL.

The input/output circuit 125 may transfer the command CMD and the address ADDR received from the memory controller 200 described with reference to FIG. 1 to the control logic 130, or may exchange data DATA with the column decoder 124.

The sensing circuit 126 may generate a reference current in response to a permission bit signal VRYBIT during the read operation or the verify operation, and compare a sensing voltage VPB received from the page buffer group 123 with a reference voltage generated by the reference current to output a pass signal PASS or a fail signal FAIL.

In an embodiment, the sensing circuit 126 may include a current sensing circuit (CSC) and/or a fail bit counter (FBC). The CSC or the FBC in the sensing circuit 126 may output the pass signal PASS or the fail signal FAIL based on the number of error bits in the read data.

In an embodiment, the sensing circuit 126 may output the pass signal PASS when the number of error bits in the read data is within an error correctable range, and the sensing circuit 126 may output the fail signal FAIL when the number of error bits in the read data is out of the error correctable range.

When the sensing circuit 126 outputs the pass signal PASS or the fail signal FAIL, the control logic 130 may output the corresponding signal to the memory controller 200 of FIG. 1. The memory controller 200 of FIG. 1 may determine whether to perform the refresh operation or the read reclaim operation based on the received pass signal PASS or fail signal FAIL.

Specifically, when the fail signal FAIL is output, the memory controller 200 of FIG. 1 may determine to not perform any additional operation.

However, when the pass signal PASS is output, the memory controller 200 of FIG. 1 may determine to selectively perform any one of the refresh operation and the read reclaim operation, depending on the number of error bits in the read data.

For example, the memory controller 200 may determine not to perform an additional operation when the number of error bits in the read data is less than a first reference value, to perform the refresh operation when the number of error bits is equal to or greater than the first reference value and less than a second reference value, and to perform the read reclaim operation when the number of error bits is equal to or greater than the second reference value.

In an embodiment, after the memory controller 200 of FIG. 1 determines to perform the refresh operation, the memory controller 200 may output a refresh command instructing to perform the refresh operation to the memory device 100.

Thereafter, the memory device 100 may perform the refresh operation corresponding to the refresh command. Specifically, when page data to which the pass signal PASS is output is refreshed, the page data for which the pass signal PASS is output may be read in response to the refresh command. When page data to which the pass signal PASS is output is read, the page data may be temporarily stored in the page buffers PB1 to PBn in the memory device 100, the page to which the pass signal PASS is output may be erased, and then the page data for which the pass signal PASS is output may be programmed to a corresponding position again. That is, when data is refreshed, the page data to which the pass signal PASS is output may not be output to the memory controller 200, and may be temporarily stored in the page buffers PB1 to PBn and then programmed to the corresponding page again.

In an embodiment, when the pass signal PASS is output, the memory controller 200 may determine to perform the read reclaim operation. After the memory controller 200 determines to perform the read reclaim operation, the memory controller 200 may output a read reclaim command instructing to perform the read reclaim operation to the memory device 100. Thereafter, the memory device 100 may move data of a memory block to which the page to which the pass signal PASS is output belongs to another memory block, in response to the read reclaim command.

The control logic 130 may output the operation signal OPSIG, the row address RADD, the page buffer control signals PBSIGNALS, and the permission bit VRYBIT in response to the command CMD and the address ADDR to control the peripheral circuit 120. For example, the control logic 130 may control the read operation of the selected memory block in response to a sub block read command and the address. In addition, the control logic 130 may control the erase operation of the selected sub block included in the selected memory block in response to the sub block erase command and the address. In addition, the control logic 130 may determine whether the verify operation passed or failed in response to the pass signal PASS or the fail signal FAIL.

In an embodiment, the control logic 130 may include the data reader 170. The data reader 170 may read the data in response to a read command received from the memory controller 200 of FIG. 1.

The data reader 170 may output the read data to the memory controller 200 according to whether a command received from the memory controller 200 is a normal read command, a page read command, or a block read command.

In an embodiment, when the command received from the memory controller 200 is a normal read command, the data reader 170 may output the read data obtained by reading the selected page to the memory controller 200.

In an embodiment, when the command received from the memory controller 200 is the page read command, read data obtained by reading a least significant bit (LSB) page or the LSB page and a center significant bit (CSB) page may be output to the memory controller 200.

In an embodiment, when the command received from the memory controller 200 of FIG. 1 is the block read command, read data obtained by reading all pages, odd pages, even pages, or a set number of pages in the memory block may be output to the memory controller 200.

Figure 3:
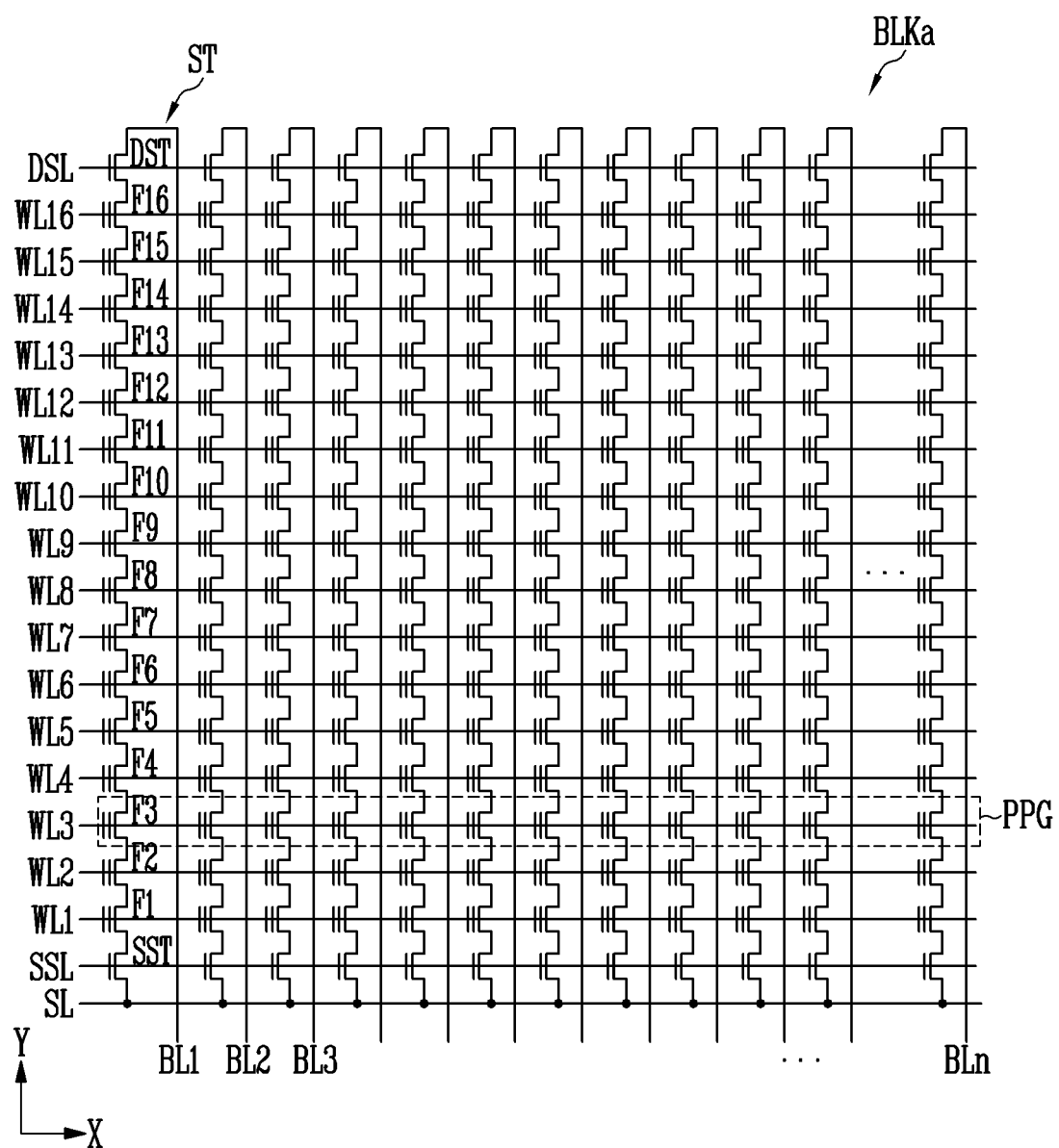
FIG. 3 is a diagram illustrating an embodiment of a memory cell array of FIG. 2.

FIG. 3 is a diagram illustrating an embodiment of the memory cell array of FIG. 2.

Referring to FIGS. 2 and 3, FIG. 3 is a circuit diagram showing any one memory block BLKa among the plurality of memory blocks BLK1 to BLKz included in the memory cell array 110 of FIG. 2.

A first select line, word lines, and a second select line arranged in parallel with each other may be connected to the memory block BLKa. For example, the word lines may be arranged in parallel with each other between the first and second select lines. Here, the first select line may be the source select line SSL, and the second select line may be the drain select line DSL.

More specifically, the memory block BLKa may include a plurality of strings connected between the bit lines BL1 to BLn and a source line SL. The bit lines BL1 to BLn may be connected to the strings, respectively, and the source line SL may be commonly connected to the strings. Since the strings may be configured to be identical to each other, a string ST connected to the first bit line BL1 is specifically described, as an example.

The string ST may include a source select transistor SST, a plurality of memory cells F1 to F16, and a drain select transistor DST connected in series between the source line SL and the first bit line BL1. One string ST may include one or more of the source select transistor SST and the drain select transistor DST, and may include more than the 16 memory cells F1 to F16 shown in the drawing.

A source of the source select transistor SST may be connected to the source line SL and a drain of the drain select transistor DST may be connected to the first bit line BL1. The memory cells F1 to F16 may be connected in series between the source select transistor SST and the drain select transistor DST. Gates of the source select transistors SST included in the different strings may be connected to the source select line SSL, gates of the drain select transistors DST may be connected to the drain select line DSL, and gates of the memory cells F1 to F16 may be connected to a plurality of word lines WL1 to WL16, respectively. A group of the memory cells connected to the same word line among the memory cells included in different strings may be referred to as a physical page PPG. Therefore, the memory block BLKa may include the physical pages PPG of the number of the word lines WL1 to WL16.

One memory cell may store one bit of data. This is commonly referred to as a single level cell (SLC). In this case, one physical page PPG may store one logical page (LPG) data. One logical page (LPG) data may include data bits of the number of memory cells included in one physical page PPG. In addition, one memory cell may store two or more bits of data. This is commonly referred to as a multi-level cell (MLC). In this case, one physical page PPG may store two or more logical page (LPG) data.

While MLC generally refers to a memory cell capable of storing two or more bits or data, as memory cell capacity has increased, MLC sometimes more specifically refers to a memory cell in which two bits of data is stored. In this case, a memory cell in which three or more bits of data are stored is referred to as a triple level cell (TLC), and a memory cell in which four or more bits of data is stored is referred to as a quadruple level cell (QLC). In general, the present invention may be applied to the memory device 100 having memory cells, each of which is capable of storing two or more bits of data.

In another embodiment, the memory block may have a three-dimensional structure. Each memory block includes a plurality of memory cells stacked on a substrate. Such plurality of memory cells are arranged along a +X direction, a +Y direction, and a +Z direction.

Figure 4A:
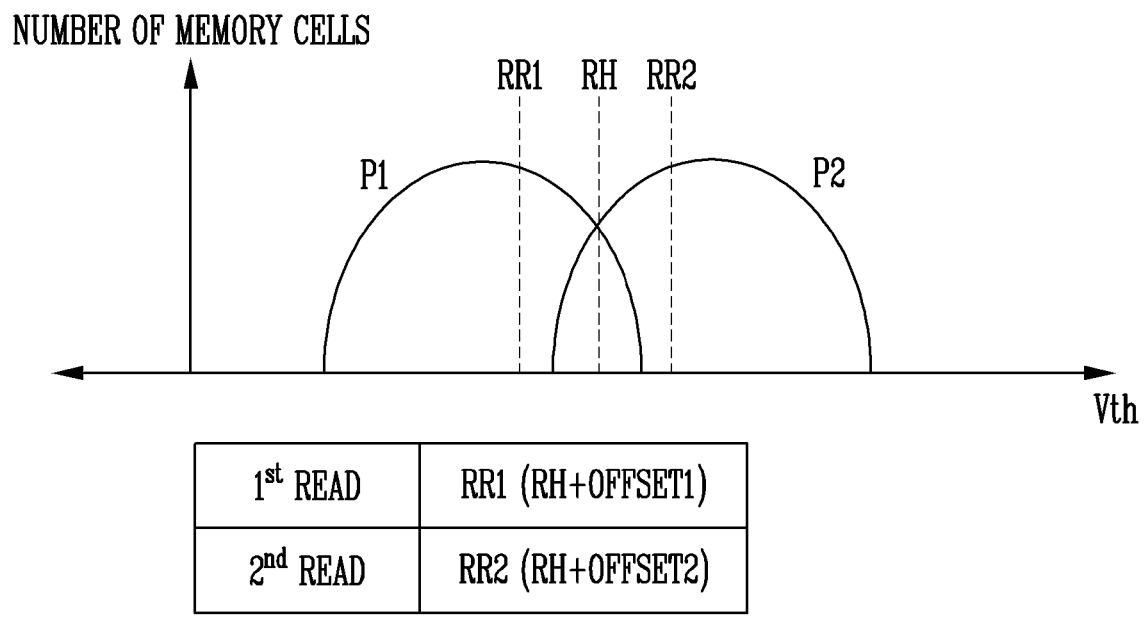
FIGS. 4A and 4B are diagrams illustrating a read retry operation and an e-boost operation performed after an error correction decoding operation failed.
Figure 4B:
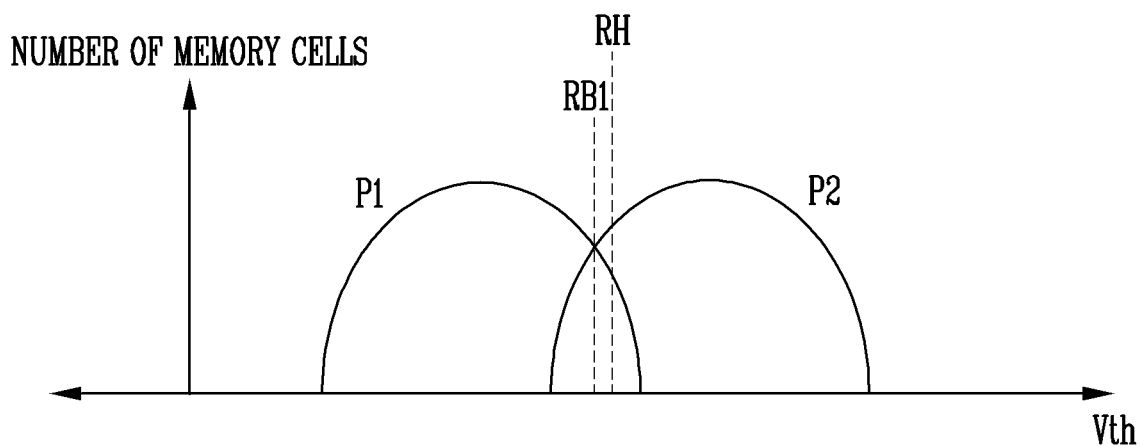

FIGS. 4A and 4B are diagrams illustrating the read retry operation and the e-boost operation performed after the error correction decoding operation failed.

Referring to FIGS. 4A and 4B, FIG. 4A shows the read retry operation and FIG. 4B shows the e-boost operation.

Referring to FIGS. 4A and 4B, FIGS. 4A and 4B show adjacent threshold voltage distributions among threshold voltage distributions of memory cells. The horizontal axis of FIGS. 4A and 4B indicates a magnitude Vth of a threshold voltage of the memory cells, and the vertical axis of FIGS. 4A and 4B indicates the ordinal number of memory cells.

In an embodiment, when the memory device 100 performs the program operation in a multi-level cell (MLC) method, FIGS. 4A and 4B may be threshold voltage distributions of memory cells in an erase state E and a first program state P1, the first program state P1 and a second program state P2, or the second program state P2 and a third program state P3, i.e., two adjacent states.

It is assumed that FIGS. 4A and 4B show threshold voltage distributions of memory cells of the first program state P1 and the second program state P2.

In an embodiment, the memory device 100 may perform the normal read operation with an RH voltage, which is a default read voltage, in correspondence with the normal read command received from the memory controller 200. Thereafter, the memory controller 200 may receive data read with the RH voltage and perform the error correction decoding operation of correcting an error included in the read data.

In an embodiment, when the number of error bits included in the read data exceeds the number of correctable bits, the error correction decoding operation may fail. In this case, the recovery operations for recovering the original data may be performed.

Referring to FIG. 4A, the read retry operation may be a read operation performed with read voltages adjacent to the RH voltage with which the read operation is performed. The read retry operation may be performed according to a priority of the read voltages. Specifically, the read retry operation may be performed with reference to a read retry table.

Referring to FIG. 4A, first and second read retry voltages RR1 and RR2 may distinguish between the first and second program states P1 and P2. RR1 and RR2 may be included in the read retry table. That is, at least two read retry voltages may be included in the read retry table.

In an embodiment, a first read operation 1st READ may be first performed using the first read retry voltage RR1, and then a second read operation 2nd READ may be performed using the second read retry voltage RR2. The first read operation 1st READ may be preferentially performed with respect to the second read operation 2nd READ according to a set priority.

In an embodiment, the first read retry voltage RR1 may be a voltage obtained by adding a first offset OFFSET1 to the RH voltage (RH+OFFSET1), and the second read retry voltage RR2 may be a voltage obtained by adding an offset OFFSET2 to the RH voltage (RH+OFFSET2).

In another embodiment, various voltages in addition to the first and second read retry voltages RR1 and RR2 may be included in the read retry table for distinguishing between the first and second program states P1 and P2. Any suitable number of read voltages may be included in the read retry table.

Referring to FIG. 4B, the e-boost operation may be an operation of determining the optimum read voltage based on a result of reading with read voltages determined based on an ideal threshold voltage distribution of the memory cells.

In FIG. 4B, assuming that the threshold voltage distribution of the memory cells is ideal, that is, that the number of memory cells corresponding to each of the erase state and the program states is equally distributed, as a result of reading with a plurality of read voltages, a first e-boost read voltage RB1 may be determined as the optimum read voltage. When the optimum read voltage is determined, the error correction decoding operation may be performed on data read with the optimum read voltage.

In an embodiment, after the error correction decoding operation failed, which of the read retry operation of FIG. 4A and the e-boost operation of FIG. 4B is to be performed may be selectively determined. That is, the e-boost operation may be performed after the read retry operation, or the read retry operation may be performed after the e-boost operation is performed.

However, as described above, simply performing a plurality of read operations in an attempt to recover original data after error correction decoding failed is not particularly effective or efficient. It may take a lot time to perform such read operations, and even after they are performed, the original data still may not be recovered.

Therefore, in an embodiment of the present disclosure, a method is presented for securing reliability of data by performing the read reclaim operation or the refresh operation according to the number of error bits in the read data during the normal read operation even though the error correction decoding operation on the read data passed during the normal read operation.

Figure 5:
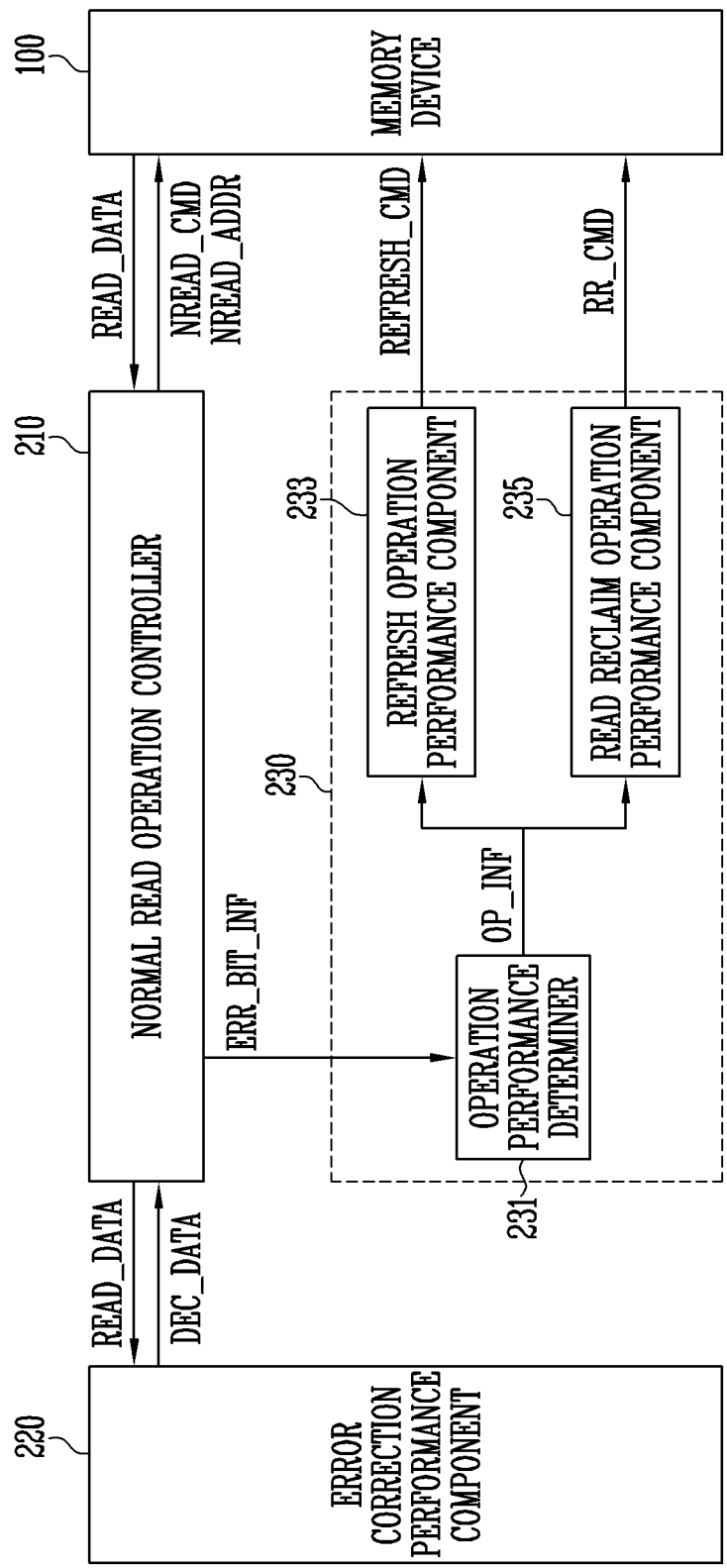
FIG. 5 illustrates an operation of a memory controller when an error correction decoding operation passes according to an embodiment of the present disclosure.

FIG. 5 illustrates an operation of the memory controller according to an embodiment of the present disclosure when the error correction decoding operation passed.

Referring to FIG. 5, the memory controller of FIG. 5 (or 200 of FIG. 1) may include the normal read operation controller 210, the error correction performance component 220, and the data recovery controller 230. In addition, the data recovery controller 230 of FIG. 5 may include an operation performance determiner 231, a refresh operation performance component 233, and a read reclaim operation performance component 235.

In an embodiment, according to a read request from the host 300, the normal read operation controller 210 may output a normal read command NREAD_CMD and a normal read address NREAD_ADDR to the memory device 100 in order to read data stored in the memory device 100. The memory device 100 may output read data READ_DATA obtained by reading data corresponding to the normal read address NREAD_ADDR in the memory device 100 to the normal read operation controller 210 in response to the normal read command NREAD_CMD.

The normal read operation controller 210 may provide the read data READ_DATA received from the memory device 100 to the error correction performance component 220. The error correction performance component 220 may perform error correction on the read data READ_DATA. For example, the error correction performance component 220 may detect error bits included in the read data READ_DATA and perform the error correction decoding operation of correcting the detected error bits.

Data read from the memory device 100 may contain one or more error bits due to retention or disturbance. Error bits may also appear in read data as a result of reading the data from the memory device 100. The error correction performance component 220 may perform the error correction decoding operation for correcting the error bit(s) in the read data.

As a result of performing the error correction decoding operation by the error correction performance component 220, the error correction decoding operation may pass or fail. Pass of the error correction decoding operation may mean that the read operation passed, and fail of the error correction decoding operation may mean that the read operation failed.

For example, when the error correction decoding operation passed, the error correction performance component 220 may output error correction decoded data DEC_DATA to the host 300. Accordingly, an operation corresponding to the read request received from the host 300 may be completed.

For example, when the error correction decoding operation failed, the error correction performance component 220 may perform the recovery operations for recovering the original data. The operations for recovering the original data may include the read retry operation of FIG. 4A and the e-boost operation of FIG. 4B.

In an embodiment, when the error correction decoding operation failed, a plurality of read operations may be performed to recover the original data in the read retry operation of FIG. 4A and the e-boost operation of FIG. 4B. However, a lot of time may be consumed in performing the plurality of read operations, and thus efficiency of the read operation as a whole may be reduced. Furthermore, even though the plurality of read operations are performed, the original data may not be recovered.

Therefore, in an embodiment of the present disclosure, a method is provided to improve reliability of data, by performing the refresh operation or the read reclaim operation on the page on which the read operation is performed, when the error correction decoding operation passed.

In the present drawing, it is assumed that the error correction decoding operation passed.

Therefore, since the error correction decoding operation passed, the error correction performance component 220 may provide the error correction decoded data DEC_DATA to the host 300 and the normal read operation controller 210. The normal read operation controller 210 may determine the number of error bits in the read data READ_DATA based on the error correction decoded data DEC_DATA. For example, the normal read operation controller 210 may determine the number of error bits included in the read data READ_DATA according to decoding information received with the error correction decoded data DEC_DATA from the error correction performance component 220. Herein, the decoding information indicates the number of error bits detected during the error correction decoding operation. For example, the normal read operation controller 210 may determine the number of error bits included in the read data READ_DATA by comparing the read data READ_DATA received from the memory device 100 with the error correction decoded data DEC_DATA received from the error correction performance component 220. Concretely, the normal read operation controller 210 may determine the number of error bits included in the read data READ_DATA based on the number of changed bits among bits included in the read data READ_DATA compared with bits included in the error correction decoded data DEC_DATA.

The normal read operation controller 210 may determine the number of error bits in the read data READ_DATA, and output error bit information ERR_BIT_INF indicating the number of error bits in the read data READ_DATA to the data recovery controller 230.

In an embodiment, the operation performance determiner 231 included in the data recovery controller 230 may receive the error bit information ERR_BIT_INF from the normal read operation controller 210. Thereafter, the operation performance determiner 231 may determine whether to perform the refresh operation or the read reclaim operation based on the error bit information ERR_BIT_INF.

For example, when the error bit information ERR_BIT_INF is less than the first reference value, the operation performance determiner 231 may determine not to perform any further operation, when the error bit information ERR_BIT_INF is equal to or greater than the first reference value and less than the second reference value, the operation performance determiner 231 may determine to perform the refresh operation, and when the error bit information ERR_BIT_INF is equal to or greater than the second reference value, the operation performance determiner 231 may determine to perform the read reclaim operation. Here, the first and second reference values may be set in advance, and the second reference value may be greater than the first reference value.

The operation performance determiner 231 may provide operation information OP_INF on the determined operation to the refresh operation performance component 233 and the read reclaim operation performance component 235.

In an embodiment, each of the refresh operation performance component 233 and the read reclaim operation performance component 235 may output a command based on the operation information OP_INF received from the operation performance determiner 231.

For example, when the operation information OP_INF includes information on the refresh operation, the refresh operation performance component 233 may output a refresh command REFRESH_CMD to the memory device 100 so that the refresh operation is performed on the page, on which the corresponding read operation is performed. The memory device 100 may perform the refresh operation on the page on which the read operation is performed, in response to the refresh command REFER SH_CMD.

For example, when the operation information OP_INF includes information on the read reclaim operation, the read reclaim operation performance component 235 may output a read reclaim command RR_CMD to the memory device 100 so that the read reclaim operation is performed on a block including the page, on which the corresponding read operation is performed. The memory device 100 may perform the read reclaim operation of moving data of the memory block including the page on which the read operation is performed to another memory block, in response to the read reclaim command RR_CMD.

FIG. 6 is a diagram illustrating an operation performed based on the number of error bits in the error correction decoded data in FIG. 5.

Referring to FIGS. 5 and 6, FIG. 6 sets forth different ranges to which the error bit information ERR_BIT_INF output from the normal read operation controller 210 of FIG. 5 belongs in correspondence with different operation information OP_INF.

In an embodiment, when the error correction decoding operation on the data read from the memory device 100 of FIG. 5 passed, the normal read operation controller 210 of FIG. 5 may determine the number of error bits in the read data by comparing the read data READ_DATA received from the memory device 100 with the error correction decoded data DEC_DATA received from the error correction performance component 220 of FIG. 5.

The error bit information ERR_BIT_INF may be generated based on the number of error bits determined by the normal read operation controller 210 of FIG. 5. The error bit information ERR_BIT_INF may indicate the number of error bits in the read data READ_DATA.

In an embodiment, when the error bit information ERR_BIT_INF is less than a first reference value TH1, the error bits in the read data may be extremely small. Therefore, the operation performance determiner 231 of FIG. 5 may determine to not perform any further operation and may not generate the operation information OP_INF.

In an embodiment, when the error bit information ERR_BIT_INF is equal to or greater than the first reference value TH1 and less than a second reference value TH2, some error bits may be included in the read data. Therefore, the operation performance determiner 231 of FIG. 5 may determine to perform the refresh operation, and may generate the operation information OP_INF including the information on the refresh operation REFRESH_OP. Thereafter, the refresh operation performance component 233 of FIG. 5 may output the refresh command REFRESH_CMD to the memory device 100 of FIG. 5 so that the refresh operation is performed on the memory device 100 of FIG. 5 based on the received operation information OP_INF.

In an embodiment, when the error bit information ERR_BIT_INF is equal to or greater than the second reference value TH2, a relatively large number of error bits may be included in the read data. Therefore, the operation performance determiner 231 of FIG. 5 may determine to perform the read reclaim operation, and may generate the operation information OP_INF including the information on the read reclaim operation RR_OP. Thereafter, the read reclaim operation performance component 235 of FIG. 5 may output the read reclaim command RR_CMD to the memory device 100 of FIG. 5 so that the read reclaim operation is performed on the memory device 100 of FIG. 5 based on the received operation information OP_INF.

Figure 7:
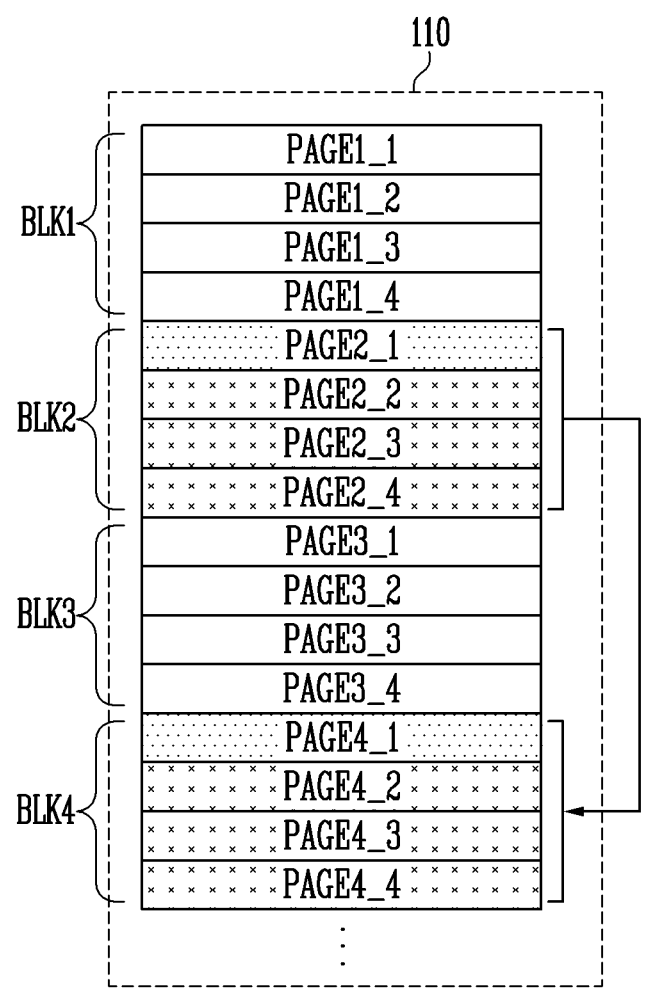
FIG. 7 is a diagram illustrating a read reclaim operation.

FIG. 7 is a diagram illustrating the read reclaim operation.

FIG. 7 shows BLK1 to BLK4 of the plurality of memory blocks BLK1 to BLKz in the memory cell array 110 of FIG. 2. In FIG. 7, each of the first to fourth memory blocks BLK1 to BLK4 includes four pages, but any suitable number of pages may be included in each memory block.

In an embodiment, the first memory block BLK1 may include (1_1)-th to (1_4)-th pages PAGE1_1 to PAGE1_4, the second memory block BLK2 may include (2_1)-th to (2_4)-th pages PAGE2_1 to PAGE2_4, the third memory block BLK3 may include (3_1)-th to (3_4)-th pages PAGE3_1 to PAGE3_4, and the fourth memory block BLK4 may include (4_1)-th to (4_4)-th pages PAGE4_1 to PAGE4_4.

In FIG. 7, it is assumed that data of the (2_1)-th page PAGE2_1 in the second memory block BLK2 is read, and an error correction decoding operation on the data of the (2_1)-th page PAGE2_1 passed.

Referring to FIGS. 5 and 6, when the number of error bits in the data of the (2_1)-th page PAGE2_1 is equal to or greater than the second reference value TH2, the read reclaim operation may be performed on the memory device 100 of FIG. 1 based on the read reclaim command RR_CMD output from the read reclaim operation performance component 235 of FIG. 5.

For example, data programmed to the (2_1)-th page PAGE2_1 is read based on the normal read command received from the memory controller 200 of FIG. 1, and then the error correction decoding operation on the read data may pass. After the error correction decoding operation on the read data passed, all data of the second memory block BLK2 including the (2_1)-th page PAGE2_1, on which the read operation was performed, may be moved to another memory block (free block), based on the number of error bits in the read data. This is referred to as read reclaim. That is, all data programmed to the memory block including the page that passed in the error correction decoding operation may be programmed to another memory block, by the read reclaim operation.

In an embodiment, all the data of the second memory block BLK2 including the (2_1)-th page PAGE2_1 may be programmed again in the fourth memory block BLK4 rather than the second memory block BLK2. The fourth memory block BLK4 may be a free block.

Thereafter, when all the data of the second memory block BLK2 is programmed to the fourth memory block BLK4 and the data of the (2_1)-th page PAGE2_1 is programmed to the (4_1)-th page PAGE4_1, the read operation to be performed on the (2_1)-th page PAGE2_1 may be performed on the (4_1)-th page PAGE4_1.

Figure 8:
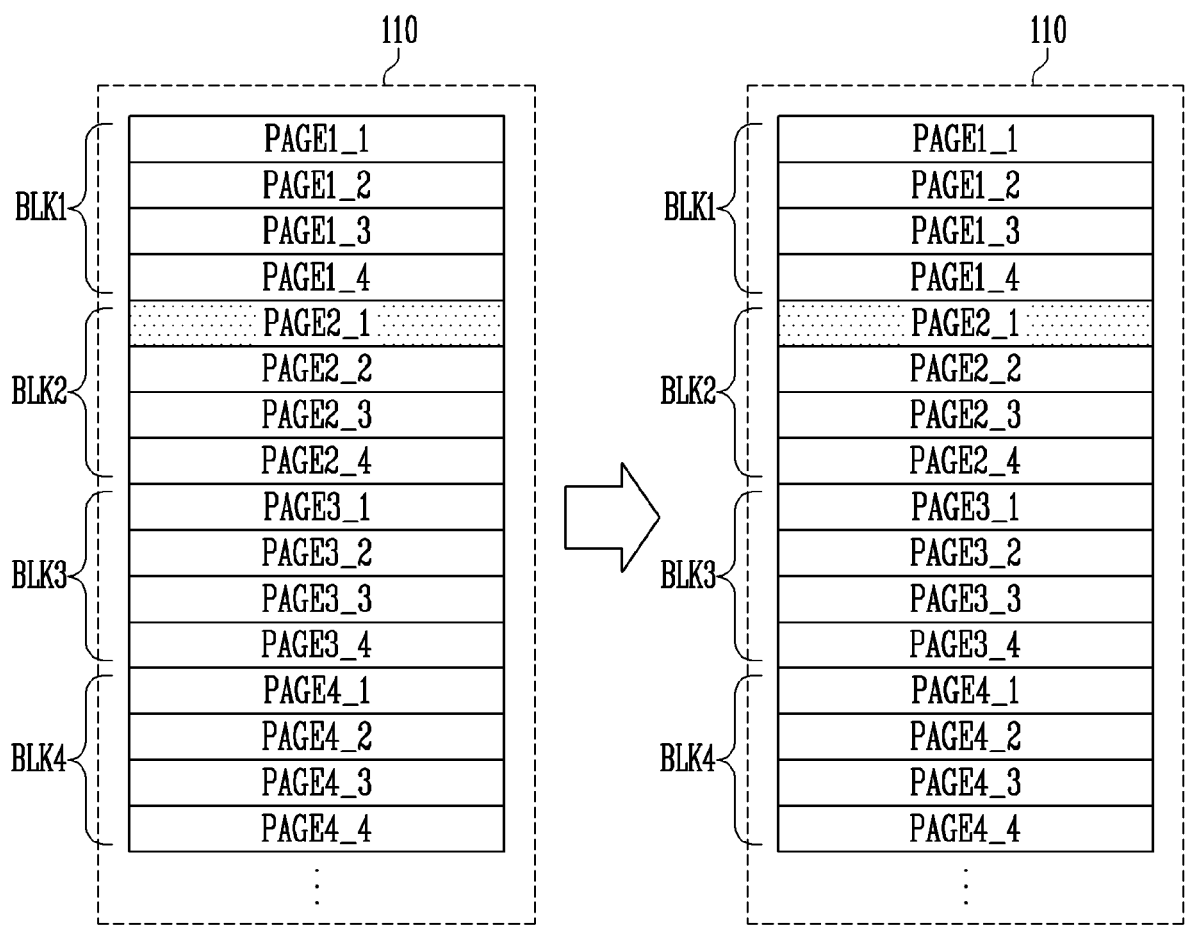
FIG. 8 is a diagram illustrating a refresh operation.

FIG. 8 is a diagram illustrating the refresh operation.

Referring to FIGS. 6 and 8, FIG. 8 shows the refresh operation performed by the memory device 100 of FIG. 1 based on the refresh command REFRESH_CMD output from the refresh operation performance component 233 of FIG. 5 when the number of error bits in the data of the (2_1)-th page PAGE2_1 read from the memory device 100 of FIG. 1 is equal to or greater than the first reference value TH1 and less than the second reference value TH2. Here, it is assumed that the error correction decoding operation on the data of the (2_1)-th page PAGE2_1 read from the memory device 100 passed.

FIG. 8 shows an operation corresponding to the refresh command REFRESH_CMD when the second memory block BLK2 including the (2_1)-th page PAGE2_1 is the page-based fail candidate. A method of determining whether the second memory block BLK2 is the page-based fail candidate or the block-based fail candidate is described in more detail with reference to FIG. 12. Here, the page-based fail candidate may mean that the probability is high that some of the pages in the second memory block BLK2 may fail in a future error correction decoding operation. In addition, the block-based fail candidate may mean that the probability is high that most of the pages in the second memory block BLK2 may fail in a future error correction decoding operation.

Figure 9:
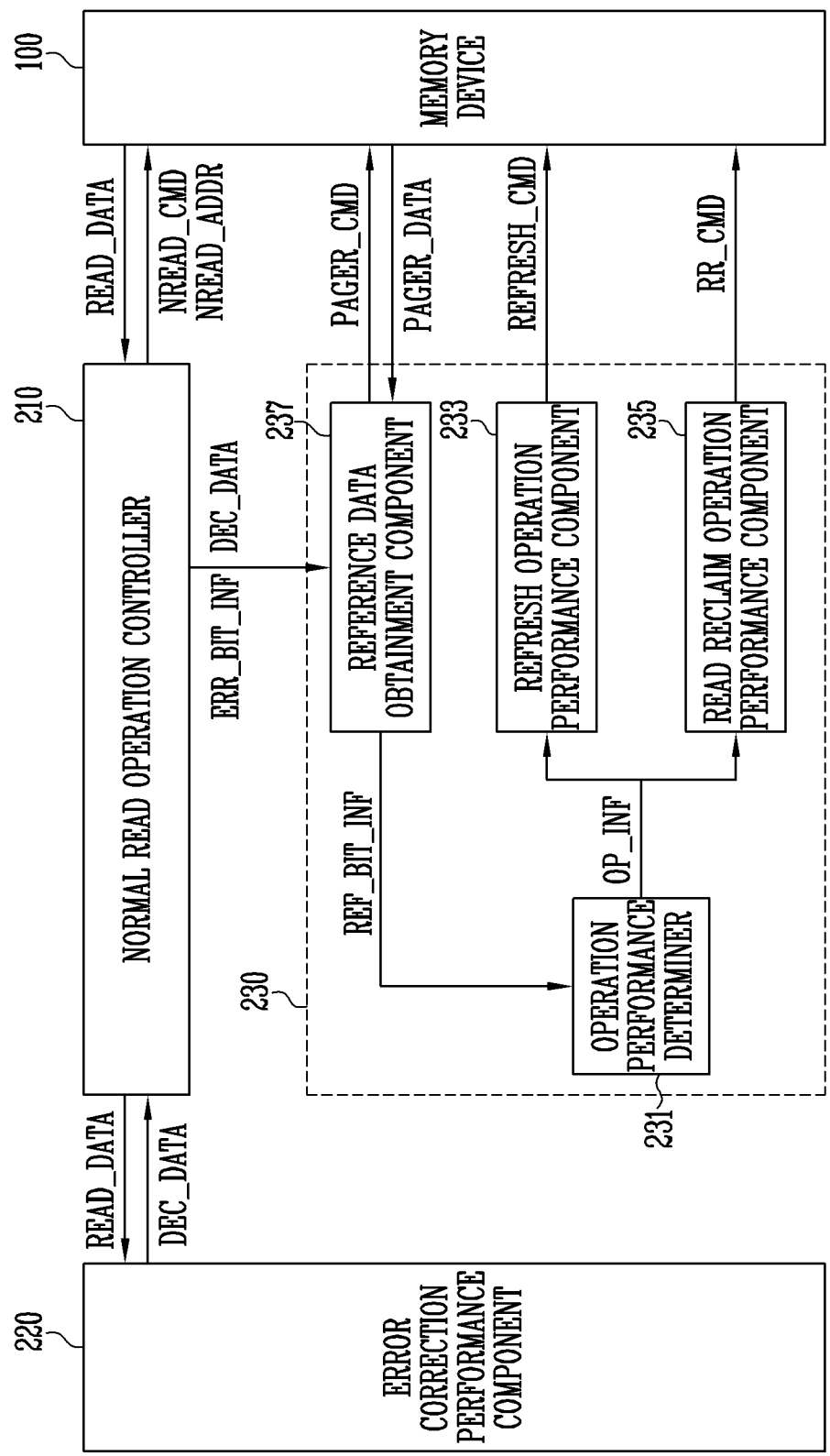
FIG. 9 illustrates an operation of a memory controller performed based on data read according to a page read command.

In an embodiment, FIG. 8 shows the refresh operation corresponding to the refresh command REFRESH_CMD that is provided when the number of error bits in the read data READ_DATA read from the (2_1)-th page PAGE2_1 is in a specific range (refer to the embodiment of FIG. 5), when the number of error bits in page read data PAGER_DATA read from the LSB page among the logical pages in the (2_1)-th page PAGE2_1 is in a specific range (refer to the embodiment of FIG. 9), or when the number of error bits in the page read data PAGER_DATA read from the LSB page in PAGE2_1 is equal to or greater than the number of error bits in the PAGER_DATA read from the CSB page in PAGE2_1 (refer to the embodiment of FIG. 9). When any of those conditions is met, the refresh operation corresponding to the refresh command REFRESH_CMD may be performed.

When the data of the page that passed the error correction decoding operation is refreshed in response to the refresh command REFRESH_CMD, the data read by the refresh operation may be temporarily stored in the page buffer or the like in the memory device 100 of FIG. 1, and may be identically programmed to the same position again after a corresponding page is erased. That is, when data is refreshed, the page data that passed in the error correction decoding operation may not be output to the memory controller 200 of FIG. 1, and may be temporarily stored in the memory device 100 of FIG. 1 and then programmed to the corresponding page again.

Referring to FIG. 8, in response to the refresh command REFRESH_CMD, the data of the (2_1)-th page PAGE2_1 may be temporarily stored in at least one of the first to n-th page buffers PB1 to PBn included in the page buffer group 123 in the memory device 100 of FIG. 2, and after the (2_1)-th page PAGE2_1 is erased, the temporarily stored data may be programmed to the (2_1)-th page PAGE2_1 again.

In an embodiment, a page read operation may be performed after the error correction decoding operation passes. The page read operation may include reading data from the LSB page among logical pages included in the (2_1)-th page PAGE2_1 or reading data from both the LSB page and the CSB page together.

Among the logical pages included in the (2_1)-th page PAGE2_1, when the number of error bits in the LSB page data belongs to a specific range or the number of error bits in the LSB page data is equal to or greater than the number of error bits in the CSB page data, the refresh operation corresponding to the refresh command REFRESH_CMD may be performed.

However, among the logical pages included in the (2_1)-th page PAGE2_1, when the number of error bits in the LSB page data is equal to or greater than a reference value or the number of error bits in the LSB page data is less than the number of error bits in the CSB page data, the read reclaim operation as shown in FIG. 7 may be performed.

In an embodiment, a block read operation may be performed after the error correction decoding operation passes. During the block read operation, data from all pages in the second memory block BLK2, data from odd pages, data from even pages, or data from a set number of pages may be error-corrected. The read operation may be performed sequentially or randomly.

As a result of performing the error correction decoding operation on the block read data, when the number of error bits in the block read data belongs to a specific range corresponding to the page-based fail candidate, the refresh operation may be performed. For example, when the number of error bits in the block read data is equal to or greater than a fifth reference value and less than a sixth reference value, the refresh operation may be performed.

Furthermore, as a result of performing the error correction decoding operation on the block read data, when the number of error bits in the block read data is equal to or greater than a specific value, thereby corresponding to the block-based fail candidate, the read reclaim operation may be performed. For example, when the number of error bits in the block read data is equal to or greater than the sixth reference value, the read reclaim operation may be performed.

For example, during the block read operation, all pages, odd pages, even pages, or a set number of pages in the second memory block BLK2 may be read, and when the number of error bits in the block read data is equal to or greater than the sixth reference value as a result of reading, a memory block including the page on which the read operation was performed may be the block-based fail candidate. In a case of the block-based fail candidate, the read reclaim operation as shown in FIG. 7 may be performed.

FIG. 9 illustrates the operation of the memory controller performed based on the data read according to the page read command.

FIG. 9 shows a process of the refresh operation or the read reclaim operation that is performed based on data newly obtained from the memory device 100 after the error correction decoding operation on the read data READ_DATA read from the memory device 100 passed.

Referring to FIGS. 5 and 9, contents of FIG. 5 and FIG. 9 are the same until the error bit information ERR_BIT_INF is output after the normal read operation controller 210 receives the read data READ_DATA corresponding to the normal read command NREAD_CMD from the memory device 100, and thus a repetitive description is omitted.

In an embodiment, the normal read operation controller 210 may determine the number of error bits in the read data READ_DATA, and output the error bit information ERR_BIT_INF indicating the number of error bits in the read data READ_DATA to the data recovery controller 230. In contrast to the embodiment of FIG. 5, the normal read operation controller 210 may output the error correction decoded data DEC_DATA together with the error bit information ERR_BIT_INF to the data recovery controller 230.

Differently from FIG. 5, the data recovery controller 230 of FIG. 9 may further include a reference data obtainment component 237. In addition, the normal read operation controller 210 may provide the error bit information ERR_BIT_INF and the error correction decoded data DEC_DATA to the reference data obtainment component 237.

In an embodiment, when the reference data obtainment component 237 receives the error bit information ERR_BIT_INF from the normal read operation controller 210, the reference data obtainment component 237 may output a page read command PAGER_CMD instructing to read the LSB page or the LSB page and the CSB page among logical pages included in the read page (for example, page PAGE2_1 of FIGS. 7 and 8) to the memory device 100. In response to the page read command PAGER_CMD, the memory device 100 may output page read data PAGER_DATA obtained by reading data from the LSB page or the LSB page and the CSB page among the logical pages included in the read page to the reference data obtainment component 237.

Thereafter, the reference data obtainment component 237 may determine the number of error bits in the page read data PAGER_DATA based on the error correction decoded data DEC_DATA received from the normal read operation controller 210 and the page read data PAGER_DATA. The reference data obtainment component 237 may generate reference bit information REF_BIT_INF indicating the number of error bits in the page read data PAGER_DATA and output the reference bit information REF_BIT_INF to the operation performance determiner 231.

In an embodiment, the operation performance determiner 231 included in the data recovery controller 230 may receive the reference bit information REF_BIT_INF from the reference data obtainment component 237. Thereafter, the operation performance determiner 231 may determine whether to perform the refresh operation or the read reclaim operation based on the reference bit information REF_BIT_INF.

For example, the memory device 100 may read data from the LSB page among the logical pages included in the read page, in response to the page read command PAGER_CMD. In this case, the reference data obtainment component 237 may compare the error correction decoded data DEC_DATA with the LSB page data to determine the number of error bits in the data of the LSB page, and generate the reference bit information REF_BIT_INF indicating the number of error bits.

As another example, the memory device 100 may read the data from the LSB page and the CSB page among the logical pages included in the read page, in response to the page read command PAGER_CMD. In this case, the reference data obtainment component 237 may compare the error correction decoded data DEC_DATA, LSB page data, and CSB page data to determine the number of error bits in the LSB page data and the number of error bits in the CSB page data, and generate the reference bit information REF_BIT_INF indicating the number of error bits.

In an embodiment, in a case where the LSB page is read among the logical pages in the read page, when the reference bit information REF_BIT_INF is less than a third reference value, the operation performance determiner 231 may determine to not perform any further operation, when the error bit information ERR_BIT_INF is equal to or greater than the third reference value and less than a fourth reference value, the operation performance determiner 231 may determine to perform the refresh operation, and when the error bit information ERR_BIT_INF is equal to or greater than the fourth reference value, the operation performance determiner 231 may determine to perform the read reclaim operation. Here, the third and fourth reference values are set in advance, and the fourth reference value may be greater than the third reference value.

In an embodiment, in a case where the LSB page and the CSB page are read among the logical pages in the read page, the reference bit information REF_BIT_INF may include information on the number of error bits in the LSB page data and the number of error bits in the CSB page data.

When the number of error bits in the LSB page data is equal to or greater than the number of error bits in the CSB page data, the operation performance determiner 231 may determine to perform the refresh operation. Conversely, when the number of error bits in the LSB page data is less than the number of error bits in the CSB page data, the operation performance determiner 231 may determine to perform the read reclaim operation.

The operation performance determiner 231 may provide operation information OP_INF on the determined operation to the refresh operation performance component 233 and the read reclaim operation performance component 235.

In an embodiment, the refresh operation performance component 233 and the read reclaim operation performance component 235 may output a command based on the operation information OP_INF received from the operation performance determiner 231.

For example, when the operation information OP_INF includes information on the refresh operation, the refresh operation performance component 233 may output a refresh command REFRESH_CMD to the memory device 100 so that the refresh operation is performed on the page, from which data is read. The memory device 100 may perform the refresh operation on the page on which the read operation is performed, in response to the refresh command REFER SH_CMD.

For example, when the operation information OP_INF includes information on the read reclaim operation, the read reclaim operation performance component 235 may output a read reclaim command RR_CMD to the memory device 100 so that the read reclaim operation is performed on a block including the page from which data is read. The memory device 100 may perform the read reclaim operation of moving data of the memory block including the page on which the read operation is performed to another memory block, in response to the read reclaim command RR_CMD.

FIGS. 10A and 10B are diagrams illustrating the logical page read by the page read command of FIG. 9.

Referring to FIGS. 10A and 10B, FIGS. 10A and 10B show a threshold voltage distribution of memory cells when the memory device 100 of FIG. 1 performs the program operation in a triple level cell (TLC) method. A horizontal axis of FIGS. 10A and 10B represent a magnitude Vth of the threshold voltage of the memory cells, and a vertical axis of FIGS. 10A and 10B represent the ordinal number of memory cells.

In an embodiment, when the memory device 100 of FIG. 1 performs the program operation in the TLC method, the memory cells may have any one of an erase state E and first to seventh program states PV1 to PV7.

In addition, a voltage for distinguishing between the erase state E and the first program state PV1 may be a first read voltage R1, a voltage for distinguishing between the first program state PV1 and the second program state PV2 may be a second read voltage R2, a voltage for distinguishing between the second program state PV2 and the third program state PV3 may be a third read voltage R3, a voltage for distinguishing between the third program state PV3 and the fourth program state PV4 may be a fourth read voltage R4, a voltage for distinguishing between the fourth program state PV4 and the fifth program state PV5 may be a fifth read voltage R5, a voltage for distinguishing between the fifth program state PV5 and the sixth program state PV6 may be a sixth read voltage R6, and a voltage for distinguishing between the sixth program state PV6 and the seventh program state PV7 may be a seventh read voltage R7.

In FIGS. 10A and 10B, since it is assumed that the memory device 100 of FIG. 1 performs the program operation in the TLC method, each of the plurality of pages included in the memory device 100 of FIG. 1 may include three logical pages. That is, each of the plurality of pages included in the memory device 100 of FIG. 1 may include a least significant bit (LSB) page, a center significant bit (CSB) page, and a most significant bit (MSB) page. In another embodiment, FIGS. 10A and 10B may be applied to a case where the memory device 100 of FIG. 5 performs the program operation in a single level cell (SLC) method, a multi-level cell (MLC) method, or a quadruple level cell (QLC) method.

Referring to FIGS. 9, 10A, and 10B, FIG. 10A shows the LSB page read in response to the page read command PAGER_CMD of FIG. 9, and FIG. 10B shows the LSB page and the CSB page read in response to the page read command PAGER_CMD of FIG. 9.

Referring to FIG. 10A, when the page read command PAGER_CMD instructs to read only the LSB page among logical pages included in the read page, data stored in the LSB page among the LSB page, the CSB page, and the MSB page may be read. Therefore, the read operation may be performed with the third read voltage R3 and the seventh read voltage R7.

Thereafter, the read LSB page data may be output to the reference data obtainment component 237 of FIG. 9, and error correction may be performed on the LSB page.

Referring to FIG. 10B, when the page read command PAGER_CMD instructs to read the LSB page and the CSB page among the logical pages included in the read page, data stored in the LSB page and the CSB page among the LSB page, the CSB page, and the MSB page may be read. Therefore, the read operation may be performed with the second read voltage R2, the third read voltage R3, the fourth read voltage R4, the sixth read voltage R6, and the seventh read voltage R7.

Thereafter, the read LSB page data and CSB page data may be output to the reference data obtainment component 237 of FIG. 9, and error correction decoded data DEC_DATA may be compared with the LSB page data and the CSB page data to determine the number of error bits in the LSB page data and CSB page data.

FIGS. 11A and 11B are diagrams illustrating an operation performed based on the number of error bits in the data read according to the page read command of FIG. 9.

Referring to FIGS. 9, 10A, 10B, 11A and 11B, FIG. 11A shows the operation information OP_INF generated when the LSB page data is read from the memory device 100 of FIG. 9 in response to the page read command PAGER_CMD, and FIG. 11B shows the operation information OP_INF generated when the LSB page data and the CSB page data are read from the memory device 100 of FIG. 9 in response to the page read command PAGER_CMD.

Referring to FIG. 11A, the reference data obtainment component 237 of FIG. 9 may determine the number of error bits in the LSB page data by comparing the error correction decoded data DEC_DATA with the LSB page data. In addition, the reference data obtainment component 237 of FIG. 9 may generate the reference bit information REF_BIT_INF indicating the number of error bits, based on a determination result. When the number of error bits in the LSB page data is less than a third reference value TH3, that is, when a value indicated by the reference bit information REF_BIT_INF is less than the third reference value TH3, the operation performance determiner 231 may determine to not perform any further operation and may not generate the operation information OP_INF.

When the number of error bits in the LSB page data read from the memory device 100 of FIG. 9 is equal to or greater than the third reference value TH3 and less than a fourth reference value TH4, that is, when the value indicated by the reference bit information REF_BIT_INF is equal to or greater than the third reference value TH3 and less than the fourth reference value TH4, the operation performance determiner 231 may determine to perform the refresh operation REFRESH_OP and may generate the operation information OP_INF including the information on the refresh operation REFRESH_OP.

When the number of error bits in the LSB page data read from the memory device 100 of FIG. 9 is equal to or greater than the fourth reference value TH4, that is, when the value indicated by the reference bit information REF_BIT_INF is equal to or greater than the fourth reference value TH4, the operation performance determiner 231 may determine to perform the read reclaim operation RR_OP and may generate the operation information OP_INF including the information on the read reclaim operation RR_OP.

Referring to FIG. 11B, the reference data obtainment component 237 of FIG. 9 may determine the number of error bits in the LSB page data and the CSB page data by comparing the error correction decoded data DEC_DATA, the LSB page data, and the CSB page data. In addition, the reference data obtainment component 237 of FIG. 9 may generate the reference bit information REF_BIT_INF indicating the number of error bits, based on a determination result. When the number of error bits in the LSB page data is equal to or greater than the number of error bits in the CSB page data, that is, when the reference bit information REF_BIT_INF indicates that the number of error bits in the LSB page data is equal to or greater than the number of error bits in the CSB page data, the operation performance determiner 231 may determine to perform the refresh operation REFRESH_OP and may generate the operation information OP_INF including the information on the refresh operation REFRESH_OP.

When the number of error bits in the LSB page data read from the memory device 100 of FIG. 9 is less than the number of error bits in the CSB page data, that is, when the reference bit information REF_BIT_INF indicates that the number of error bits in the LSB page data is less than the number of error bits included in the CSB page data, the operation performance determiner 231 may determine to perform the read reclaim operation RR_OP and may generate the operation information OP_INF including the information on the read reclaim operation RR_OP.

Figure 12:
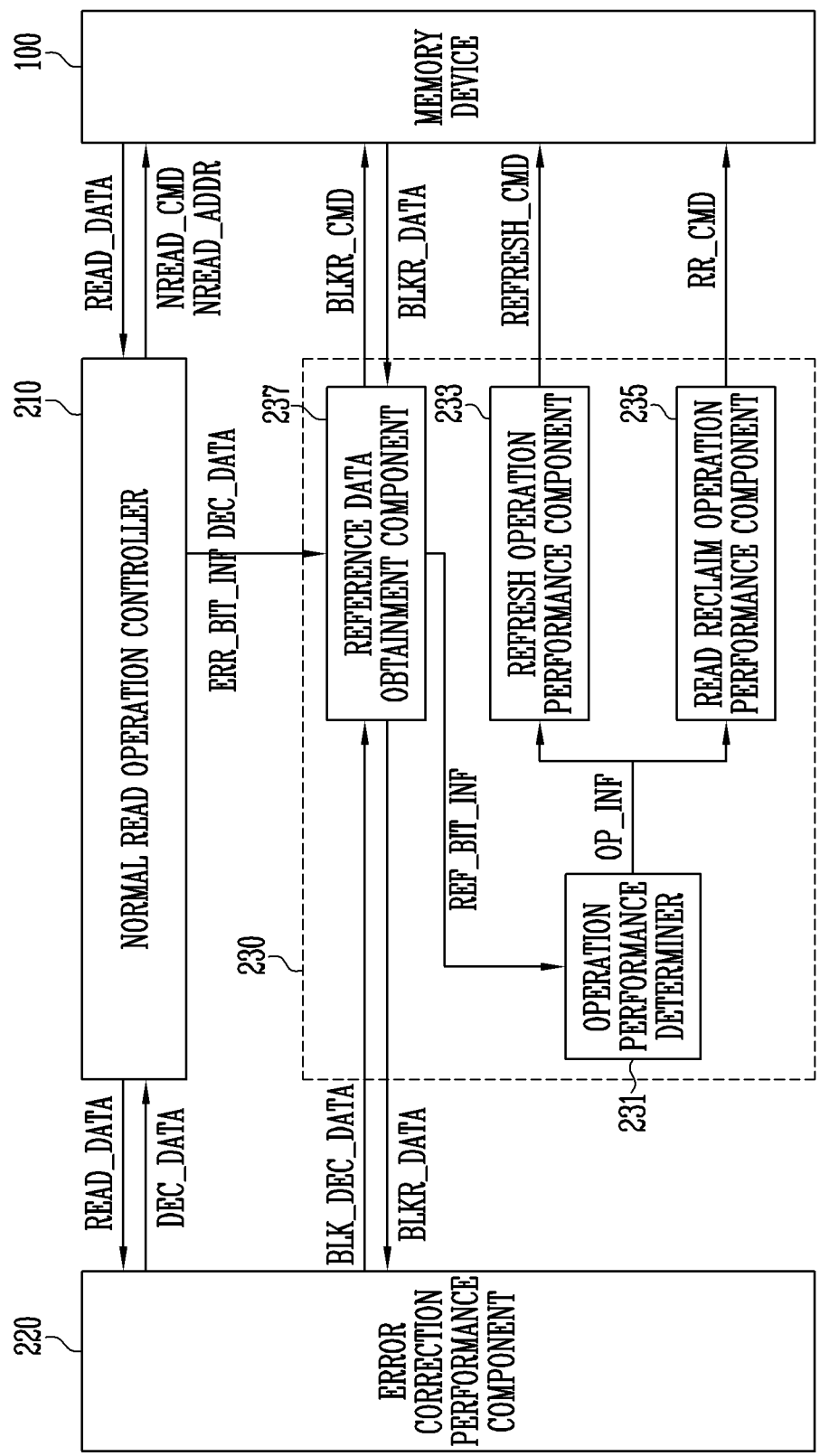
FIG. 12 illustrates operation of the memory controller performed based on data read according to a block read command.

FIG. 12 illustrates the operation of the memory controller performed based on the block data read according to the block read command.

FIG. 12 shows a process of the refresh operation or the read reclaim operation that is performed based on the block data obtained from the memory device 100 after the error correction decoding operation on the read data READ_DATA read from the memory device 100 passed.

Referring to FIGS. 9 and 12, contents of FIG. 9 and FIG. 12 are the same until the error bit information ERR_BIT_INF is output after the normal read operation controller 210 receives the read data READ_DATA corresponding to the normal read command NREAD_CMD from the memory device 100, and thus a repetitive description is omitted.

In an embodiment, the normal read operation controller 210 may determine the number of error bits in the read data READ_DATA, and output the error bit information ERR_BIT_INF indicating the number of error bits in the read data READ_DATA to the data recovery controller 230. The normal read operation controller 210 may output the error correction decoded data DEC_DATA together with the error bit information ERR_BIT_INF to the data recovery controller 230.

In an embodiment, when the reference data obtainment component 237 receives the error bit information ERR_BIT_INF from the normal read operation controller 210, the reference data obtainment component 237 may output a block read command BLKR_CMD instructing to read data from all the pages, from the odd pages, from the even pages, or from a set number of pages in the memory block including the read page (for example, PAGE2_1 of FIGS. 7 and 8) to the memory device 100. The read operation may be performed sequentially or randomly.

The memory device 100 may read data from a corresponding memory block including the read page in response to the block read command BLKR_CMD and output the block read data BLKR_DATA to the reference data obtainment component 237.

In an embodiment, the reference data obtainment component 237 may provide the block read data BLKR_DATA to the error correction performance component 220, and the error correction performance component 220 may perform the error correction decoding operation of detecting and correcting error bits in the block read data BLKR_DATA. Thereafter, when the error correction decoding operation passes, the error correction performance component 220 may provide block error correction decoded data BLK_DEC_DATA obtained by correcting the error bits in the block read data BLKR_DATA to the reference data obtainment component 237.

The reference data obtainment component 237 may compare the block error correction decoded data BLK_DEC_DATA with the block read data BLKR_DATA, and generate the reference bit information REF_BIT_INF based on a comparison result. The reference bit information REF_BIT_INF may indicate the number of error bits in the block read data BLKR_DATA. Concretely, the reference data obtainment component 237 may determine the number of error bits included in the block read data BLKR_DATA based on the number of changed bits among bits included in the block read data BLKR_DATA compared with bits included in the block error correction decoded data BLK_DEC_DATA.

In another embodiment, the reference data obtainment component 237 may determine the number of error bits included in the block read data BLKR_DATA according to decoding information received with the block error correction decoded data BLK_DEC_DATA from the error correction performance component 220. Herein, the decoding information indicates the number of error bits detected during the error correction decoding operation.

In an embodiment, it may be determined whether the memory block on which the block read operation corresponding to the block read command BLKR_CMD is performed the page-based fail candidate or the block-based fail candidate, based on the number of error bits in the block read data BLKR_DATA. Here, the page-based fail candidate may mean that the probability is high that some of the pages in the memory block may fail in a future error correction decoding operation. In addition, the block-based fail candidate may mean that the probability is high that most of the pages in the memory block may fail in a future error correction decoding operation.

For example, when the number of error bits in the block read data BLKR_DATA is less than a fifth reference value, the memory block on which the operation corresponding to the block read command BLKR_CMD is performed may not be the page-based fail candidate or the block-based fail candidate.

However, when the number of error bits in the block read data BLKR_DATA is equal to or greater than the fifth reference value and less than a sixth reference value, the memory block on which the operation corresponding to the block read command BLKR_CMD is performed may be the page-based fail candidate, and when the number of error bits in the block read data BLKR_DATA is greater than the sixth reference value, the memory block on which the operation corresponding to the block read command BLKR_CMD is performed may be the block-based fail candidate. When the memory block is the page-based fail candidate, the operation corresponding to the refresh command REFRESH_CMD may be performed, and when the memory block is the block-based fail candidate, the operation corresponding to the read reclaim command RR_CMD may be performed.

In an embodiment, the operation performance determiner 231 may receive the reference bit information REF_BIT- _INF from the reference data obtainment component 237. The reference bit information REF_BIT_INF may indicate the number of error bits in the block read data BLKR_DATA read by the block read operation corresponding to the block read command BLKR_CMD.

When the reference bit information REF_BIT_INF indicates that the memory block is the page-based fail candidate, the operation performance determiner 231 may determine to perform the refresh operation. Conversely, when the reference bit information REF_BIT_INF indicates that the memory block is the block-based fail candidate, the operation performance determiner 231 may determine to perform the read reclaim operation.

The operation performance determiner 231 may provide the operation information OP_INF on the determined operation to the refresh operation performance component 233 and the read reclaim operation performance component 235.

In an embodiment, the refresh operation performance component 233 and the read reclaim operation performance component 235 may output the command based on the operation information OP_INF received from the operation performance determiner 231.

For example, when the operation information OP_INF includes the information on the refresh operation, the refresh operation performance component 233 may output the refresh command REFRESH_CMD to the memory device 100 so that the page on which the normal read operation is performed is refreshed. The memory device 100 may perform the refresh operation on the page on which the normal read operation is performed, in response to the refresh command REFRESH_CMD.

For example, when the operation information OP_INF includes the information on the read reclaim operation, the read reclaim operation performance component 235 may output the read reclaim command RR_CMD to the memory device 100 so that the read reclaim operation is performed on the memory block on which the block read operation is performed. The memory device 100 may perform the read reclaim operation of moving data of the memory block on which the block read operation is performed to another memory block, in response to the read reclaim command RR_CMD.

FIGS. 13A to 13D are diagrams illustrating the operation corresponding to the block read command of FIG. 12.

Referring to FIGS. 12 and 13A to 13D, FIGS. 13A to 13D shows the second memory block BLK2, among the first to fourth memory blocks BLK1 to BLK4 in the memory cell array 110 of FIG. 12. In FIGS. 13A to 13D, it is assumed that the normal read operation is performed on the (2_1)-th page PAGE2_1 among the pages in the second memory block BLK2 in response to the normal read command NREAD_CMD, and the error correction decoding operation on normal read data passed.

Referring to FIGS. 12 and 13A to 13D, after the error correction decoding operation on the (2_1)-th page PAGE2_1 passed, the memory device 100 of FIG. 12 may receive the block read command BLKR_CMD from the reference data obtainment component 237 of FIG. 12.

The memory device 100 may output the block read data BLKR_DATA obtained by reading all the pages, the odd pages, the even pages, or the set number of pages in the memory block including the (2_1)-th page PAGE2_1 on which the normal read operation is performed to the reference data obtainment component 237 of FIG. 12. The block read command BLKR_CMD may be a command output to determine whether the memory block including the page on which the normal read operation is performed is the block-based fail candidate or the page-based fail candidate.

Figure 13A:
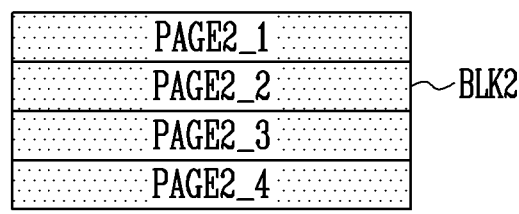
FIGS. 13A to 13D are diagrams illustrating operation corresponding to the block read command of FIG. 12.

FIG. 13A shows a case where the memory device 100 of FIG. 12 reads all pages, that is, the (2_1)-th to (2_4)-th pages PAGE2_1 to PAGE2_4, in the second memory block BLK2 in response to the block read command BLKR_CMD. The memory device 100 of FIG. 12 may sequentially or randomly read these pages.

For example, the memory device 100 of FIG. 12 may read sequentially from the (2_1)-th page PAGE2_1 to the (2_4)-th page PAGE2_4, or may randomly read the (2_1)-th to (2_4)-th pages PAGE2_1 to PAGE2_4.

Figure 13B:
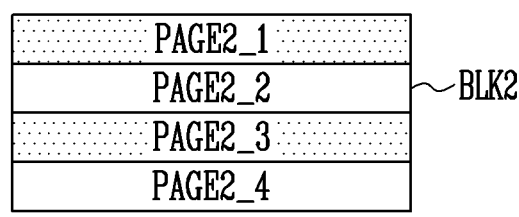

FIG. 13B shows a case where the memory device 100 of FIG. 12 reads the odd pages among all the pages in the second memory block BLK2 including the (2_1)-th page PAGE2_1 in response to the block read command BLKR_CMD. That is, the memory device 100 of FIG. 12 may read the (2_1)-th and (2_3)-th pages PAGE2_1 and PAGE2_3, which are the odd pages, in response to the block read command BLKR_CMD.

Figure 13C:
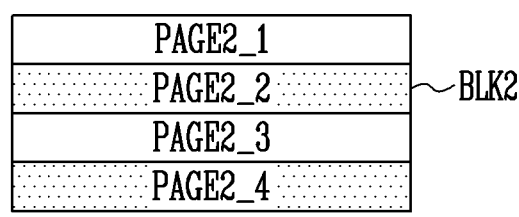

FIG. 13C shows a case where the memory device 100 of FIG. 12 reads the even pages among all the pages in the second memory block BLK2 including the (2_1)-th page PAGE2_1 in response to the block read command BLKR_CMD. That is, the memory device 100 of FIG. 12 may read the (2_2)-th and (2_4)-th pages PAGE2_2 and PAGE2_4, which are the even pages, in response to the block read command BLKR_CMD.

Figure 13D:
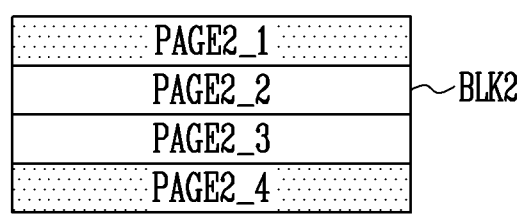

FIG. 13D shows a case where the memory device 100 of FIG. 12 reads a set number of pages among all the pages in the second memory block BLK2 including the (2_1)-th page PAGE2_1 in response to the block read command BLKR_CMD.

For example, when the number of pages to be read in response to the block read command BLKR_CMD is set to '2', the memory device 100 of FIG. 12 may randomly select and read two pages among the pages in the second memory block BLK2. In FIG. 13D, the two pages that the memory device 100 of FIG. 12 randomly selects and reads may be the (2_1)-th and (2_4)-th pages PAGE2_1 and PAGE2_4.

As described above, the memory device 100 of FIG. 12 may receive the block read command BLKR_CMD from the reference data obtainment component 237 of FIG. 12, perform the block read operation in response to the received block read command BLKR_CMD, and output the block read data BLKR_DATA, which is a result of performing the block read operation, to the reference data obtainment component 237 of FIG. 12.

Thereafter, the reference data obtainment component 237 of FIG. 12 may output the block read data BLKR_DATA to the error correction performance component 220. As a result of performing the error correction decoding operation by outputting the block read data BLKR_DATA to the error correction performance component 220, it may be determined whether the memory block including the page on which the normal read operation was performed is the page-based fail candidate or the block-based fail candidate based on the number of error bits in the block read data BLKR_DATA. The page-based fail candidate may mean that the probability is high that some of the pages in the memory block may fail in a future error correction decoding operation. In addition, the block-based fail candidate may mean that the probability is high that most of the pages in the memory block may fail in a future error correction decoding operation.

In an embodiment, when the memory block including the page on which the normal read operation was performed is the block-based fail candidate, the memory device 100 of FIG. 12 may perform the read reclaim operation on the corresponding memory block as shown in FIG. 7.

However, when the memory block including the page on which the normal read operation was performed is the page-based fail candidate, the memory device 100 of FIG. 12 may perform the refresh operation on the page on which the normal read operation is performed as shown in FIG. 8.

FIG. 14 is a diagram illustrating an operation performed based on the number of error bits in the data read according to the block read command of FIG. 12.

Referring to FIGS. 12 and 14, a first column of FIG. 14 represents ranges in which the reference bit information REF_BIT_INF output from the reference data obtainment component 237 of FIG. 12 belongs, and a second column of FIG. represents various operation information OP_INF, each of which is aligned with the corresponding range to which the reference bit information REF_BIT_INF belongs.

In an embodiment, when the error correction decoding operation on the block read data BLKR_DATA read from the memory device 100 passes, the reference data obtainment component 237 of FIG. 12 may determine the number of error bits in the block read data BLKR_DATA.

The reference bit information REF_BIT_INF may be generated based on the number of error bits determined by the reference data obtainment component 237 of FIG. 12. The reference bit information REF_BIT_INF may indicate the number of error bits included in the block read data BLKR_DATA.

In an embodiment, when the reference bit information REF_BIT_INF is less than a fifth reference value TH5, the memory block including the page on which the normal read operation was performed may not be the page-based fail candidate or the block-based fail candidate. Therefore, the operation performance determiner 231 of FIG. 12 may determine to not perform any further operation and may not generate the operation information OP_INF.

In an embodiment, when the reference bit information REF_BIT_INF is equal to or greater than the fifth reference value TH5 and less than a sixth reference value TH6, the memory block including the page on which the normal read operation was performed may be the page-based fail candidate. Therefore, the operation performance determiner 231 of FIG. 12 may determine to perform the refresh operation and may generate the operation information OP_INF including the information on the refresh operation REFRESH_OP. Thereafter, the refresh operation performance component 233 of FIG. 12 may output the refresh command REFRESH_CMD to the memory device 100 of FIG. 12 so that the refresh operation is performed on the memory device 100 of FIG. 5 based on the received operation information OP_INF.

In an embodiment, when the reference bit information REF_BIT_INF is equal to or greater than the sixth reference value TH6, the memory block including the page on which the normal read operation was performed may be the block-based fail candidate. Therefore, the operation performance determiner 231 of FIG. 12 may determine to perform the read reclaim operation and may generate the operation information OP_INF including the information on the read reclaim operation RR_OP. Thereafter, the read reclaim operation performance component 235 of FIG. 12 may output the read reclaim command RR_CMD to the memory device 100 of FIG. 12 so that the read reclaim operation is performed on the memory device 100 of FIG. 5 based on the received operation information OP_INF.

Figure 15:
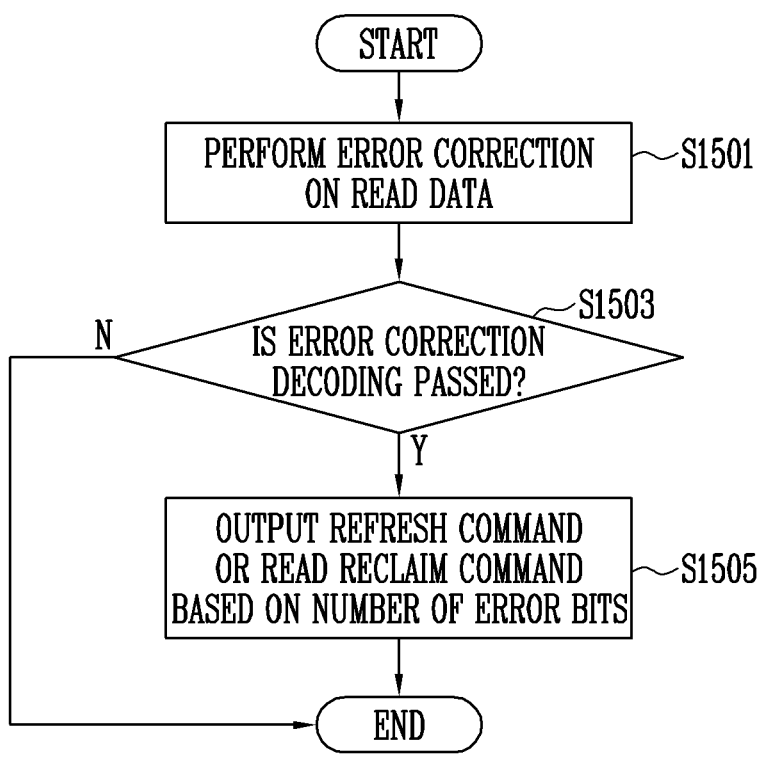
FIG. 15 is a diagram illustrating operation of the memory controller according to an embodiment of the present disclosure.

FIG. 15 is a diagram illustrating operation of the memory controller according to an embodiment of the present disclosure.

Referring to FIG. 15, in operation S1501, the memory controller may perform error correction on data read through a normal read operation performed in response to a normal read command. For example, the memory controller may detect error bits in the read data and perform the error correction decoding operation on the detected error bits.

In operation S1503, the memory controller may determine whether the error correction decoding operation passed. When it is determined that the error correction decoding operation passed (Y), flow may proceed to operation S1505.

In operation S1505, the memory controller may output the refresh command or the read reclaim command based on the number of error bits in the read data.

According to an embodiment of the present disclosure, even though the error correction decoding operation on the normal read operation passed, the read reclaim operation or the refresh operation is performed on the page on which the normal read operation was performed according to the number of error bits in the normal read operation, and thus reliability of data may be improved.

Figure 16:
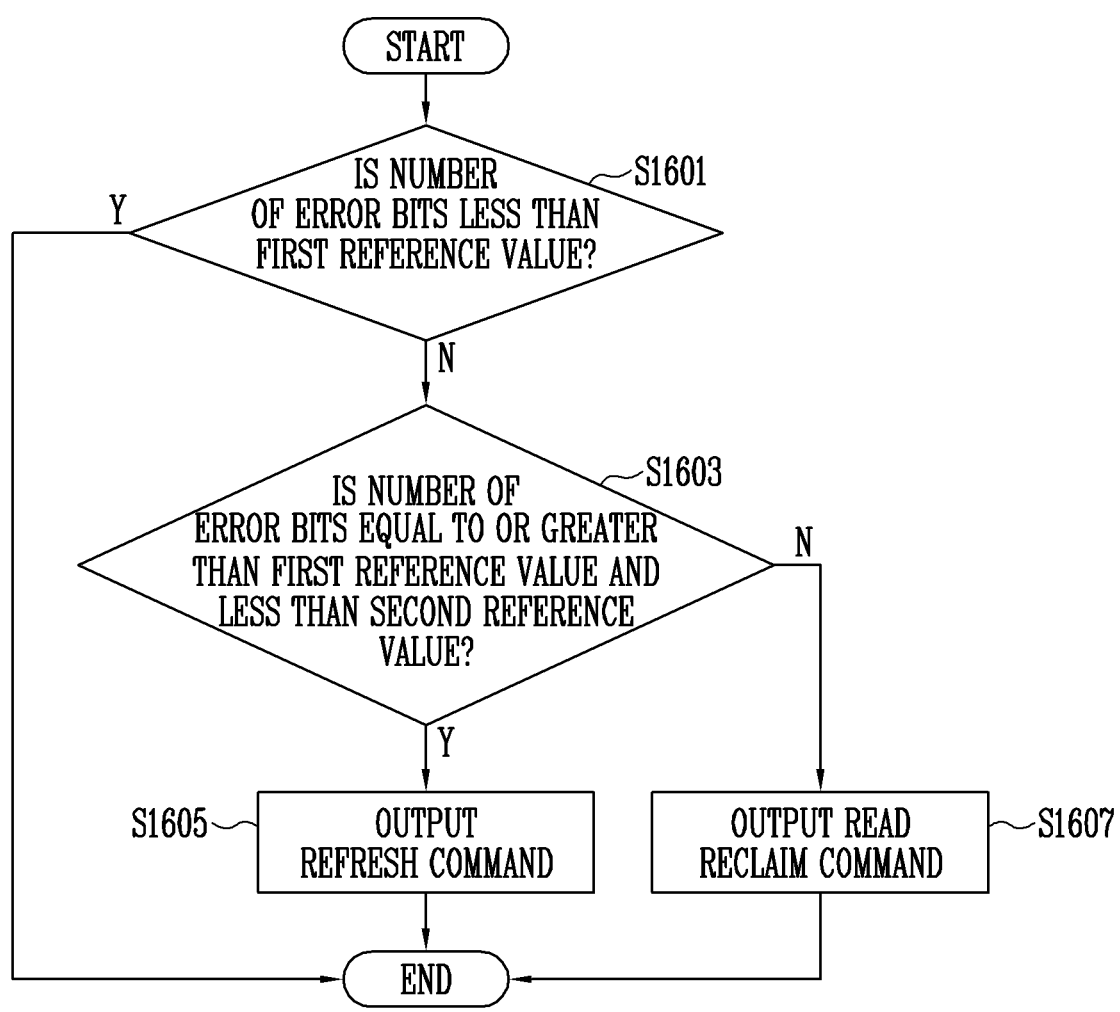
FIG. 16 is a diagram illustrating operation of the memory controller according to an embodiment of the present disclosure.

FIG. 16 is a diagram illustrating operation of the memory controller according to an embodiment of the present disclosure.

FIG. 16 is a flowchart illustrating operation S1505 in more detail.

In operation S1601, the memory controller may determine whether the number of error bits in the data read by the normal read operation is less than the first reference value. When the number of error bits in the data read by the normal read operation is not less than the first reference value (N), the operation may proceed to operation S1603.

In operation S1603, the memory controller may determine whether the number of error bits in the data read by the normal read operation is equal to or greater than the first reference value and less than the second reference value.

When the number of error bits in the data read by the normal read operation is equal to or greater than the first reference value and less than the second reference value (Y), the operation may proceed to operation S1605, and when the number of error bits in the data read by the normal read operation is equal to or greater than the first reference value and is not less than the second reference value (N), that is, equal to or greater than the second reference value, flow may proceed to operation S1607.

In operation S1605, the memory controller may output the refresh command for refreshing the page on which the normal read operation was performed. In an embodiment, when the number of error bits in the data read by the normal read operation is within a specific range, the refresh operation on the corresponding page may be performed, and thus reliability of data may be increased.

In operation S1607, the memory controller may output the read reclaim command so that the read reclaim operation is performed on a block including the page on which the normal read operation was performed. In an embodiment, when the number of error bits in the data read by the normal read operation is large, the read reclaim operation on the block including the corresponding page may be performed, and thus reliability of data may be increased.

Figure 17:
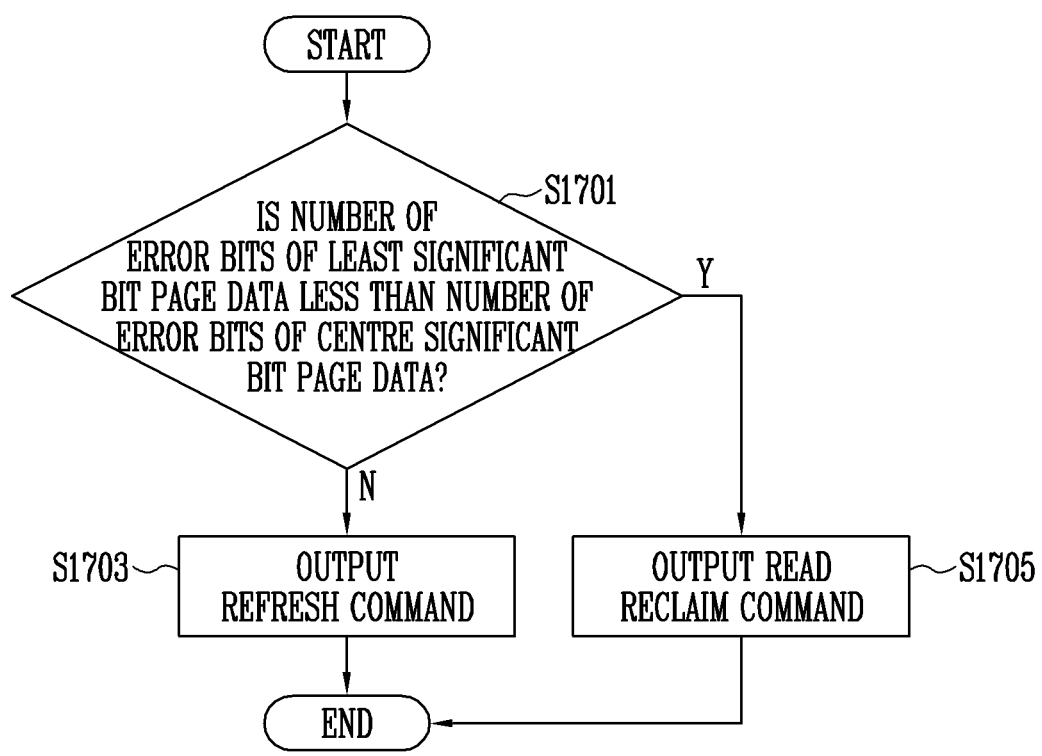
FIG. 17 is a diagram illustrating operation of the memory controller according to an embodiment of the present disclosure.

FIG. 17 is a diagram illustrating operation of the memory controller according to an embodiment of the present disclosure.

Referring to FIGS. 15 and 17, FIG. 17 is a flowchart illustrating operation S1505 in more detail. FIG. 17 shows operations after the read operation, corresponding to the page read command output from the memory controller, is performed after the error correction decoding operation on the normal read operation passed. The page read command may be a command instructing to read data from the LSB page or read data from the LSB page and the CSB page together among the logical pages in the read page (for example, PAGE2_1 of FIGS. 7 and 8).

In operation S1701, it may be determined whether the number of error bits of the LSB page data in the memory device is less than the number of error bits of the CSB page data.

When the number of error bits of the LSB page data is not less than the number of error bits of the CSB page data (N), that is, when the number of error bits of the LSB page data is equal to or greater than the number of error bits of the CSB page data, flow may proceed to operation S1703, and when the number of error bits of the LSB page data is less than the number of error bits of the CSB page data (Y), flow may proceed to operation S1705.

In operation S1703, the memory controller may output the refresh command to the memory device. That is, when the number of error bits of the LSB page data is equal to or greater than the number of error bits of the CSB page data, the memory controller may output the refresh command to the memory device so that the refresh operation on the page on which the normal read operation is performed is performed.

In operation S1705, the memory controller may output the read reclaim command to the memory device. That is, when the number of error bits of the LSB page data is less than the number of error bits of the CSB page data, the memory controller may output the read reclaim command to the memory device so that the read reclaim operation is performed on the block including the page on which the normal read operation was performed.

Figure 18:
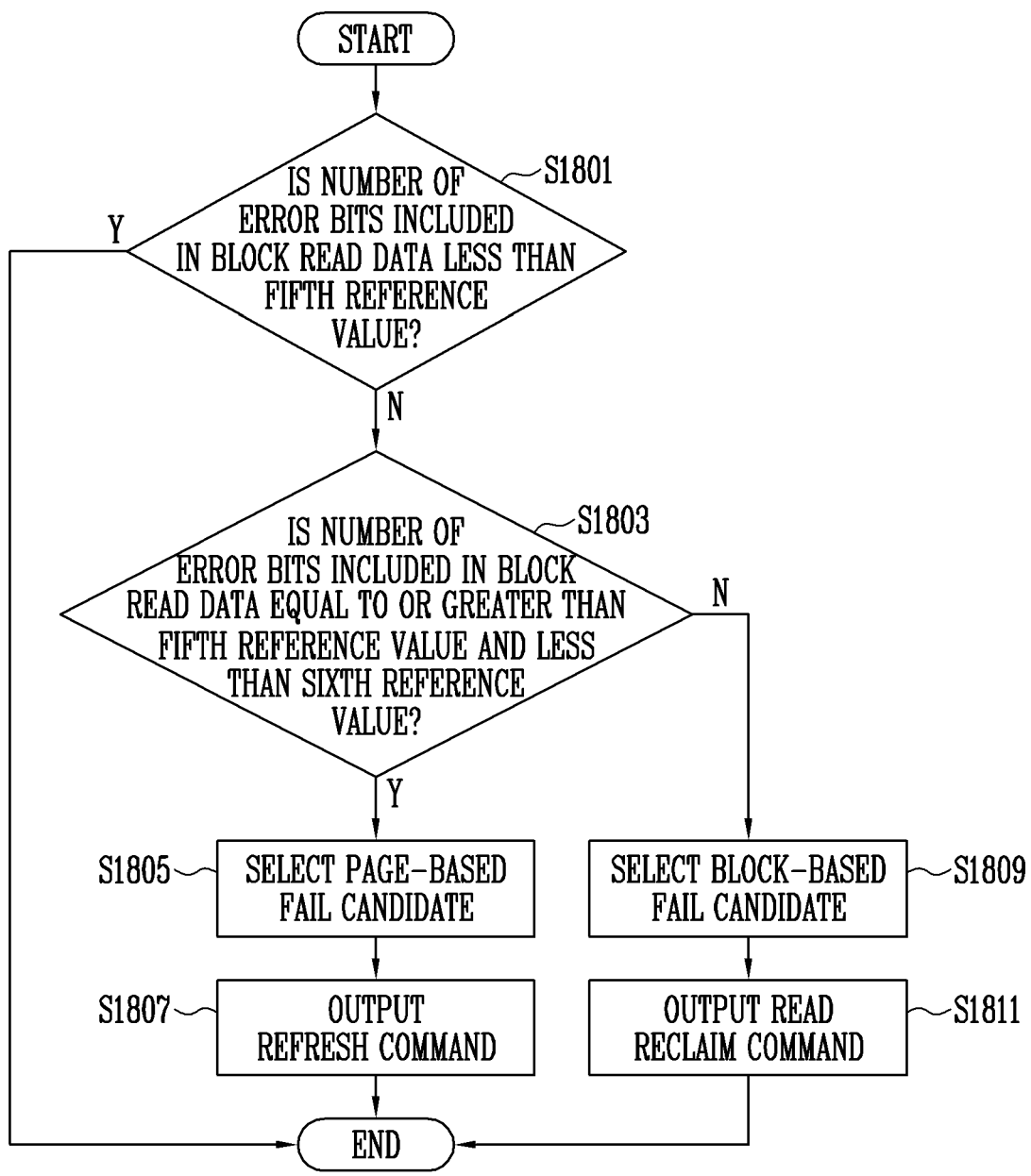
FIG. 18 is a diagram illustrating operation of the memory controller according to an embodiment of the present disclosure.

FIG. 18 is a diagram illustrating operation of the memory controller according to an embodiment of the present disclosure.

Referring to FIGS. 15 and 18, FIG. 18 is a flowchart illustrating operation S1505 in more detail. FIG. 18 shows operations after the block read operation corresponding to the block read command output from the memory controller is performed after the error correction decoding operation on the normal read operation passed. The block read command may be a command instructing to read all pages, only odd pages, only even pages, or a set number of pages in the memory block including the page that passed the error correction decoding operation.

In operation S1801, the memory controller may determine whether the number of error bits in the block read data is less than the fifth reference value. When the number of error bits included in the block read data is not less than the fifth reference value (N), flow proceeds to operation S1803.

In operation S1803, the memory controller may determine whether the number of error bits in the block read data is equal to or greater than the fifth reference value and less than the sixth reference value. When the number of error bits in the block read data is equal to or greater than the fifth reference value and less than the sixth reference value (Y), flow may proceed to operation S1805, and when the number of error bits in the block read data is greater than the fifth reference value and is not less than the sixth reference value (N), that is, equal to or greater than the sixth reference value, flow may proceed to operation S1809.

In operation S1805, the memory controller may select the memory block including the page that passed in the error correction decoding operation as the page-based fail candidate. The page-based fail candidate may mean that the probability is high that some of the pages in the memory block may fail in a future error correction decoding operation.

In operation S1807, when the memory block is selected as the page-based fail candidate, the memory controller may output the refresh command to the memory device so that the refresh operation is performed on the page that passed in the error correction decoding operation.

In operation S1809, the memory controller may select the memory block including the page that passed in the error correction decoding operation as the block-based failure candidate. The block-based fail candidate may mean that the probability is high that most of the pages in the memory block may fail in a future error correction decoding operation.

In operation S1811, when the memory block is selected as the block-based fail candidate, the memory controller may output the read reclaim command to the memory device so that the read reclaim operation is performed on the memory block including the page that passed in the error correction decoding operation.

Figure 19:
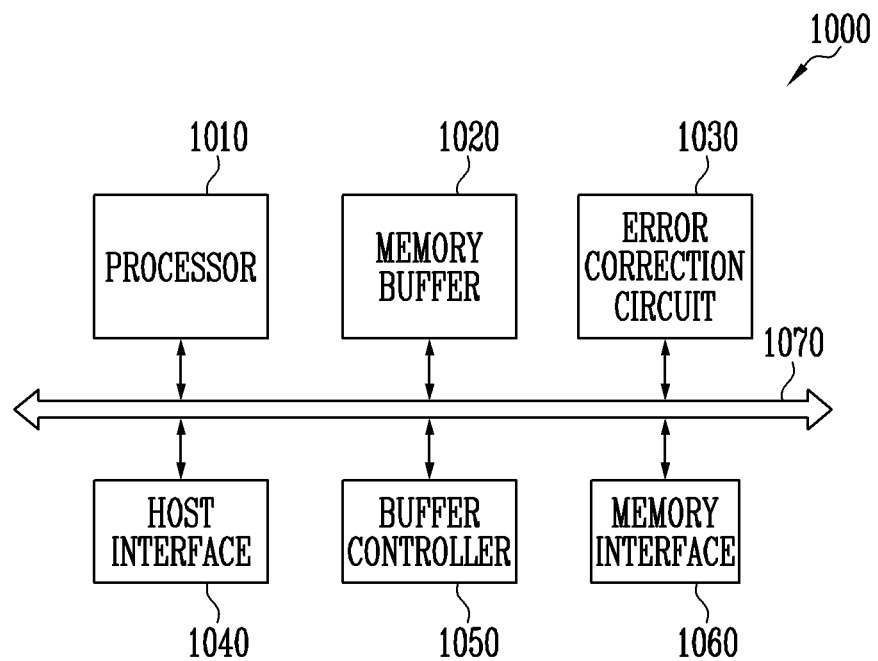
FIG. 19 is a diagram illustrating another embodiment of the memory controller of FIG. 1.

FIG. 19 is a diagram illustrating another embodiment of the memory controller of FIG. 1.

The memory controller 1000 is connected to a host and the memory device. The memory controller 1000 is configured to access the memory device in response to the request from the host. For example, the memory controller 1000 is configured to control write, read, erase, and background operations of the memory device. The memory controller 1000 is configured to provide an interface between the memory device and the host. The memory controller 1000 is configured to drive firmware for controlling the memory device.

Referring to FIG. 19, the memory controller 1000 may include a processor 1010, a memory buffer 1020, an error correction circuit (ECC) 1030, a host interface 1040, a buffer controller (or buffer control circuit) 1050, a memory interface 1060, and a bus 1070.

The bus 1070 may be configured to provide a channel between components of the memory controller 1000.

The processor 1010 may control overall operation of the memory controller 1000 and may perform a logical operation. The processor 1010 may communicate with the external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of the FTL. The processor 1010 may translate the LBA provided by the host into the PBA through the FTL. The FTL may receive the LBA and translate the LBA into the PBA using a mapping table. Any of various address mapping methods, e.g., page mapping, block mapping or hybrid mapping, may be employed by the flash translation layer to perform the translation. Which one is selected depends on a mapping unit.

The processor 1010 is configured to randomize data received from the host. For example, the processor 1010 may randomize the data received from the host using a randomizing seed. The randomized data is provided to the memory device as data to be stored and is programmed to the memory cell array.

The processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error correction circuit 1030 may perform error correction. The error correction circuit 1030 may perform error correction encoding (ECC encoding) based on data to be written to the memory device through memory interface 1060. The error correction encoded data may be transferred to the memory device through the memory interface 1060. The error correction circuit 1030 may perform error correction decoding (ECC decoding) on the data received from the memory device through the memory interface 1060. For example, the error correction circuit 1030 may be included in the memory interface 1060 as a component of the memory interface 1060.

In an embodiment, when the memory device 100 of FIG. 1 performs the read operation, the error correction circuit 1030 may perform the error correction decoding operation on the data read from the memory device 100 of FIG. 1.

In an embodiment of the present disclosure, even though the error correction decoding operation on the read data is passed, the read reclaim operation or the refresh operation may be performed according to the number of error bits included in the read data in order to solve the problem of previously used recovery operations, namely, that they involve many read operations and the data may still not be recovered.

For example, the processor 1010 may determine the number of error bits in the data read by the normal read operation based on the error correction decoded data, and may determine to perform the read reclaim operation or the refresh operation based on a determination result. Alternatively, the number of error bits may be determined based on a result of error correction decoding on data read in addition to the data read by the normal read operation, and it may be determined to perform the read reclaim operation or the refresh operation based on a determination result.

In an embodiment, the processor 1010 may output the read reclaim command or the refresh command to the memory device 100 of FIG. 1 so that the determined operation is performed on the memory device 100 of FIG. 1.

The host interface 1040 is configured to communicate with an external host under control of the processor 1010. The host interface 1040 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and/or a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050. Instead, the memory buffer 1020 and buffer controller 1050 may be separate devices or one separate integrated device.

For example, the processor 1010 may control the operation of the memory controller 1000 using codes. The processor 1010 may load the codes from a non-volatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other so as not to interfere with, or affect, each other. The data bus may be connected to the host interface 1040, the buffer controller 1050, the error correction circuit 1030, and the memory interface 1060. The control bus may be connected to the host interface 1040, the processor 1010, the buffer controller 1050, the memory buffer 1020, and the memory interface 1060.

Figure 20:
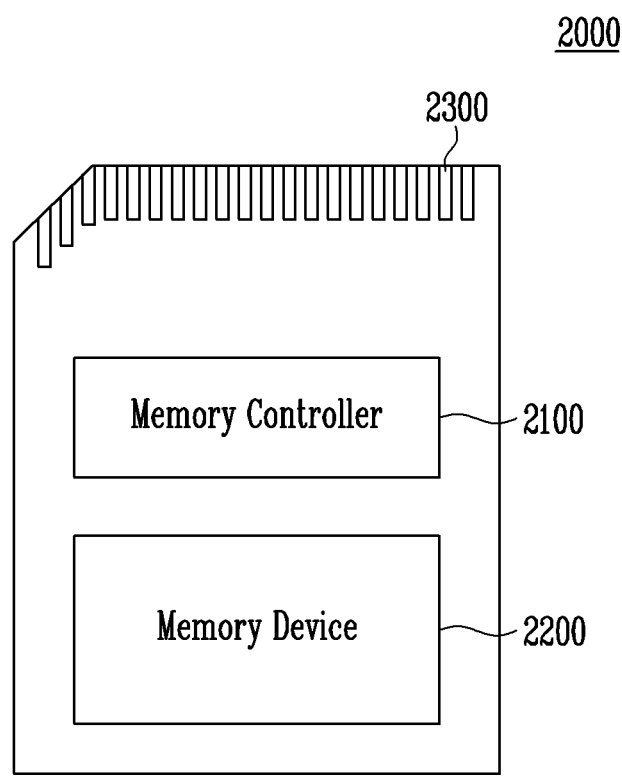
FIG. 20 is a block diagram illustrating a memory card system to which the storage device is applied according to an embodiment of the present disclosure.

FIG. 20 is a block diagram illustrating a memory card system to which the storage device is applied according to an embodiment of the present disclosure.

Referring to FIG. 20, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and the host. The memory controller 2100 is configured to drive firmware for controlling the memory device 2200. The memory device 2200 may be implemented by the memory device 100 of FIG. 1.

For example, the memory controller 2100 may include components such as a random access memory (RAM), a processor, a host interface, a memory interface, and an error correction circuit.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multi-media card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and/or an NVMe. For example, the connector 2300 may be defined by at least one of the various communication standards described above.

For example, the memory device 2200 may be implemented as any of various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and/or a spin transfer torque magnetic RAM (STT-MRAM).

The memory controller 2100 and the memory device 2200 may be integrated into one semiconductor device to configure a memory card, such as a PC card (personal computer memory card international association (PCMCIA)), a compact flash card (CF), a smart media card (SM or SMC), a memory stick, a multimedia card (MMC, RS-MMC, MMC-micro, or eMMC), an SD card (SD, miniSD, microSD, or SDHC), and/or a universal flash storage (UFS).

In an embodiment, when the memory device 2200 performs the read operation, the memory controller 2100 may perform the error correction decoding operation on the data read from the memory device 2200.

In an embodiment of the present disclosure, even though the error correction decoding operation on the read data passed, the read reclaim operation or the refresh operation may be performed according to the number of error bits in the read data in order to solve the above-identified problem of previously used recovery operations.

For example, the memory controller 2100 may determine the number of error bits in the data read by the normal read operation based on the error correction decoded data, and may determine to perform the read reclaim operation or the refresh operation based on a determination result. Alternatively, the number of error bits may be determined based on a result of error correction decoding on data additionally read in addition to the data read by the normal read operation, and it may be determined to perform the read reclaim operation or the refresh operation based on a determination result.

In an embodiment, the memory controller 2100 may output the read reclaim command or the refresh command to the memory device 2200 so that the determined operation is performed on the memory device 2200.

Figure 21:
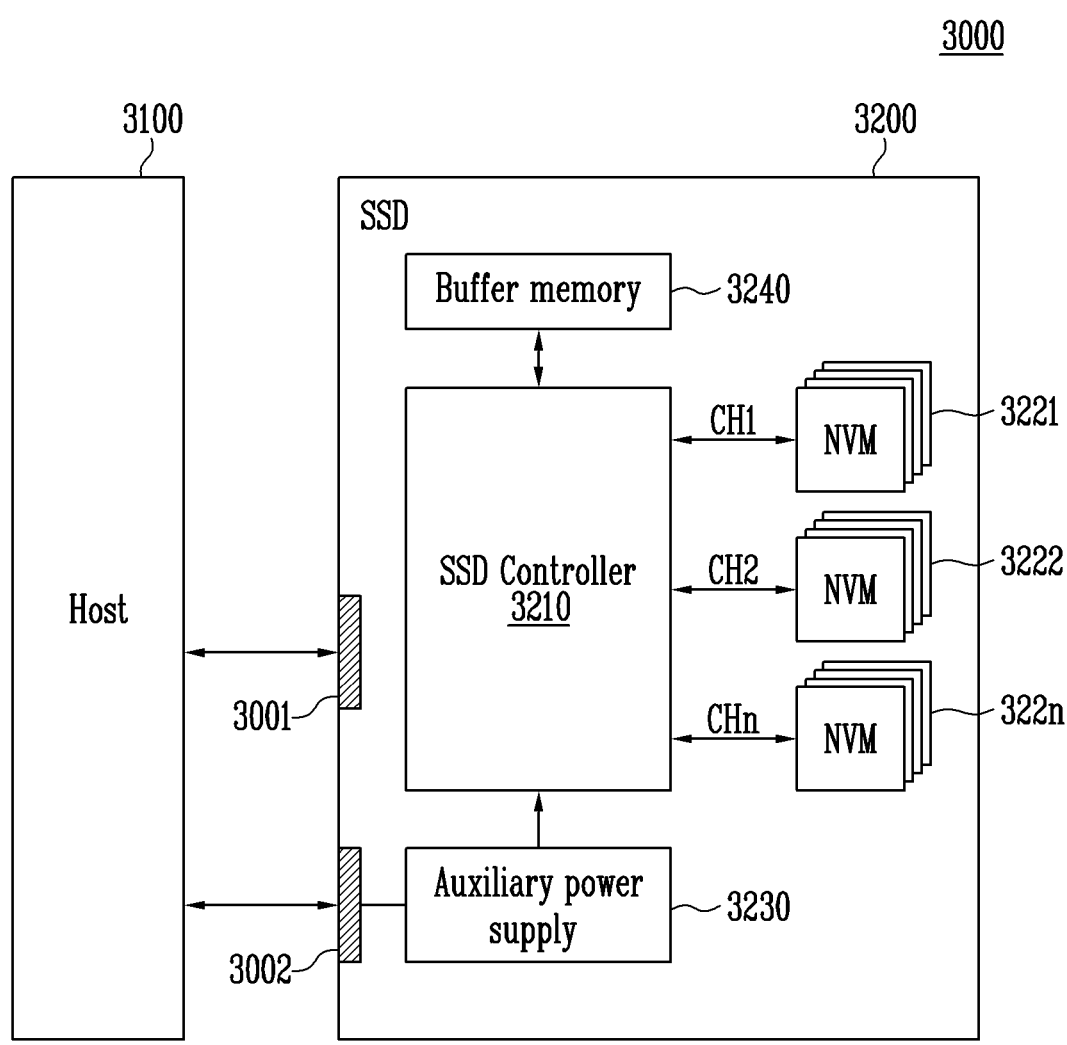
FIG. 21 is a block diagram illustrating a solid state drive (SSD) system to which the storage device is applied according to an embodiment of the present disclosure.

FIG. 21 is a block diagram illustrating a solid state drive (SSD) system to which the storage device is applied according to an embodiment of the present disclosure.

Referring to FIG. 21, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

In an embodiment, the SSD controller 3210 may perform a function of the memory controller 200 of FIG. 1.

The SSD controller 3210 may control the plurality of flash memories 3221 to 322n in response to the signal SIG received from the host 3100. For example, the signal SIG may be multiple signals based on an interface between the host 3100 and the SSD 3200. For example, the signal SIG may be defined by at least one of interfaces such as a universal serial bus (USB), a multi-media card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and/or an NVMe.

In an embodiment, when the flash memories 3221 to 322n perform the read operation, the SSD controller 3210 may perform the error correction decoding operation on the data read from the flash memories 3221 to 322n.

In an embodiment of the present disclosure, even though the error correction decoding operation on the read data passed, the read reclaim operation or the refresh operation may be performed according to the number of error bits in the read data in order to solve the above-identified problem of previously used recovery operations.

For example, the SSD controller 3210 may determine the number of error bits in the data read by the normal read operation based on the error correction decoded data, and may determine to perform the read reclaim operation or the refresh operation based on a determination result. Alternatively, the number of error bits may be determined based on a result of error correction decoding on data additionally read in addition to the data read by the normal read operation, and it may be determined to perform the read reclaim operation or the refresh operation based on a determination result.

In an embodiment, the SSD controller 3210 may output the read reclaim command or the refresh command to the flash memories 3221 to 322n so that the determined operation is performed on the flash memories 3221 to 322n.

The auxiliary power device 3230 is connected to the host 3100 through the power connector 3002. The auxiliary power device 3230 may receive the power PWR from the host 3100 and may charge the power. The auxiliary power device 3230 may provide power of the SSD 3200 when power from the host 3100 is not smoothly supplied. For example, the auxiliary power device 3230 may be disposed in or external to the SSD 3200. For example, the auxiliary power device 3230 may be disposed on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

Figure 22:
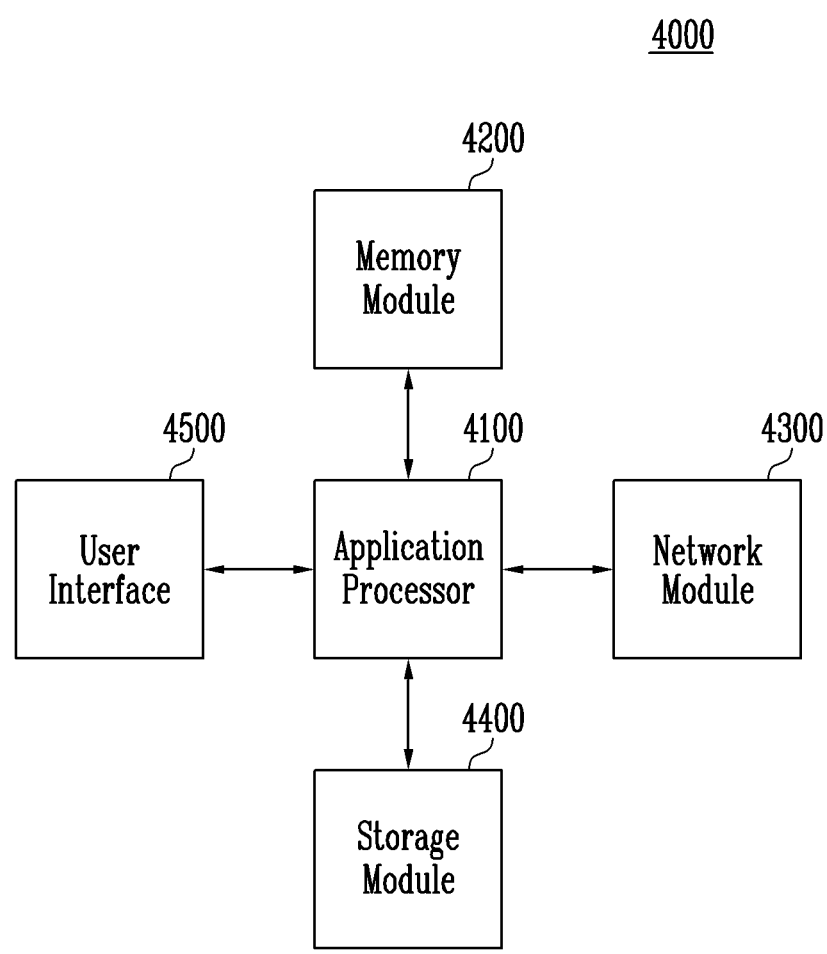
FIG. 22 is a block diagram illustrating a user system to which the storage device is applied according to an embodiment of the present disclosure.

FIG. 22 is a block diagram illustrating a user system to which the storage device is applied according to an embodiment of the present disclosure.

Referring to FIG. 22, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDRAM, an LPDDR2 SDRAM, and an LPDDR3 SDRAM, or a non-volatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and WI-FI. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of non-volatile memory devices, each of which may operate the same as the memory device described with reference to FIGS. 2 and 3. The storage module 4400 may operate the same as the storage device 50 described with reference to FIG. 1.

In an embodiment, when the storage module 4400 performs the read operation, the application processor 4100 may perform the error correction decoding operation on the data read from the storage module 4400.

In an embodiment of the present disclosure, even though the error correction decoding operation on the read data passed, the read reclaim operation or the refresh operation may be performed according to the number of error bits in the read data in order to solve the above-identified problem of previously used recovery operations.

For example, the application processor 4100 may determine the number of error bits in the data read by the normal read operation based on the error correction decoded data, and may determine to perform the read reclaim operation or the refresh operation based on a determination result. Alternatively, the number of error bits may be determined based on a result of error correction decoding on data additionally read in addition to the data read by the normal read operation, and it may be determined to perform the read reclaim operation or the refresh operation based on a determination result.

In an embodiment, the application processor 4100 may output the read reclaim command or the refresh command to the storage module 4400 so that the determined operation is performed on the storage module 4400.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

While the present invention has been illustrated and described with respect to various embodiments, those skilled in the art will understand in view of the present disclosure that various changes may be made to any of the disclosed embodiments within the spirit and scope of the invention. The present invention encompasses all such changes to the extent they fall within the scope of the claims.

What is claimed is:

1. A memory system comprising:
   a memory device including a plurality of pages; and
   a memory controller configured to correct an error in read data obtained by reading a selected page among the plurality of pages, and determine whether to perform a refresh operation on the selected page based on a number of error bits in the read data;
   wherein the memory controller comprises:
   a normal read operation controller configured to control a read operation on the selected page and determine the number of error bits in the read data;
   an error correction performance component configured to correct the read data; and
   a data recovery controller configured to control the refresh operation on the selected page based on the number of error bits in the read data when the error in the read data is corrected,
   wherein the data recovery controller controls the refresh operation on the selected page only when an error correction decoding operation performed by the error correction performance component to correct the error in the read data passed.

2. The memory system of claim 1,
   wherein the normal read operation controller is further configured to provide the read data to the error correction performance component in order to correct the error in the read data,
   wherein the error correction performance component corrects the error in the read data through an error correction decoding operation, and
   wherein the error correction performance component is further configured to generate, when the error correction decoding operation passed, error correction decoded data and provide the error correction decoded data to the normal read operation controller.

3. The memory system of claim 2,
   wherein the normal read operation controller determine the number of error bits in the read data by comparing the read data with the error correction decoded data, and
   wherein the normal read operation controller is further configured to output error bit information indicating the number of error bits based on a determination result.

4. The memory system of claim 1, wherein the data recovery controller comprises:
   an operation performance determiner configured to receive error bit information indicating the number of error bits from the normal read operation controller, after an error correction decoding operation of correcting the error in the read data passed, determine to perform the refresh operation or a read reclaim operation on a block including the selected page based on the error bit information, and generate operation information related to the determined operation;
   a refresh operation performance component configured to output a refresh command so that the refresh operation is performed on the selected page based on the operation information; and a refresh operation performance component configured to output a read reclaim command so that the read reclaim operation is performed on the block based on the operation information.

5. The memory system of claim 4,
wherein the operation performance determiner generates the operation information indicating the refresh operation when the error bit information that the number of error bits is equal to or greater than a first reference value and less than a second reference value, and
wherein the second reference value is greater than the first reference value.

6. The memory system of claim 5, wherein the operation performance determiner generates the operation information indicating the read reclaim operation when the error bit information indicates that the number of error bits is equal to or greater than the second reference value.

7. The memory system of claim 4, wherein the data recovery controller further comprises a reference data obtainment component configured to control a read operation after receiving, from the normal read operation controller, the error bit information indicating the number of error bits and error correction decoded data according to an error correction decoding operation of correcting the error in the read data, when the error correction decoding operation passed.

8. The memory system of claim 7, wherein the reference data obtainment component is further configured to output, to the memory device, a page read command instructing to read at least one of logical pages in the selected page.

9. The memory system of claim 8, wherein the reference data obtainment component is further configured to receive least significant bit page data among the logical pages in the selected page, the least significant bit page data being output from the memory device in response to the page read command.

10. The memory system of claim 9, wherein the reference data obtainment component is further configured to output reference bit information indicating a number of error bits in the least significant bit page data based on a comparison result obtained by comparing the least significant bit page data with the error correction decoded data, and
wherein the operation performance determiner determines to perform the refresh operation or the read reclaim operation based on the error bit information and the reference bit information.

11. The memory system of claim 8, wherein the reference data obtainment component is further configured to receive least significant bit page data and center significant bit page data among the logical pages in the selected page, the least significant bit page data and the center significant bit page data being output from the memory device in response to the page read command.

12. The memory system of claim 11, wherein the reference data obtainment component is further configured to output reference bit information indicating a number of error bits in the least significant bit page data and a number of error bits in the center significant bit page data based on a comparison result obtained by comparing the number of error bits in the least significant bit page data with the number of error bits in the center significant bit page data, and
wherein the operation performance determiner determines to perform the refresh operation or the read reclaim operation based on the error bit information and the reference bit information.

13. The memory system of claim 7, wherein the reference data obtainment component is further configured to output, to the memory device, a block read command instructing to read at least one of pages in a memory block including the selected page.

14. The memory system of claim 13, wherein the reference data obtainment component is further configured to output, to the error correction performance component, block read data read in response to the block read command and receive, from the error correction performance component, block error correction decoded data obtained by correcting error bits in the block read data.

15. The memory system of claim 14, wherein the reference data obtainment component is further configured to determine a number of error bits in the block read data by comparing the block read data and the block error correction decoded data, and output reference bit information indicating whether the memory block including the selected page is a page-based fail candidate or a block-based fail candidate based on a result of the determination, and
wherein the operation performance determiner determines to perform the refresh operation or the read reclaim operation based on the error bit information and the reference bit information.

16. The memory system of claim 15, wherein the page-based fail candidate refers to a memory block candidate having a high probability that some of pages in the memory block including the selected page will fail in a future error correction operation, and the block-based fail candidate refers to a memory block candidate having a high probability that a majority of the pages in the memory block including the selected page will fail in a future error correction operation.

17. The memory system of claim 15, wherein the operation performance determiner generates the operation information indicating the refresh operation when the reference bit information indicates the page-based fail candidate.

18. The memory system of claim 15, wherein the operation performance determiner generates the operation information indicating the read reclaim operation when the reference bit information indicates the block-based fail candidate.

19. A method of operating a memory system, which comprises a memory device including a plurality of pages, and a memory controller configured to correct an error in read data obtained by reading a selected page among the plurality of pages, and determine whether to perform a refresh operation on the selected page based on a number of error bits in the read data, the method comprising:
reading the selected page to obtain the read data;
correcting the error in the read data;
determining the number of error bits in the read data when correction of the error in the read data passed; and
controlling the refresh operation on the selected page based on the number of error bits in the read data,
wherein the controlling the refresh operation comprises controlling the refresh operation on the selected page only when an error correction decoding operation performed in the correcting the error in the read data passed.

20. A memory controller controlling a memory device including a plurality of pages, the memory controller comprising:
a normal read operation controller configured to control a read operation on a selected page among the plurality of pages and determine a number of error bits in read data read from the memory device during the read operation;

an error correction performance component configured to correct the error in the read data; and a data recovery controller configured to control a refresh operation on the selected page based on the number of error bits in the read data when the error in the read data is corrected, wherein the data recovery controller controls the refresh operation on the selected page only when an error correction decoding operation performed by the error correction performance component to correct the error in the read data passed.

21. An operating method of a controller, the operating method comprising:

providing read data, which has been successfully read from a page, to a host; and controlling, based on a number of error bits detected in the read data, a memory device to selectively perform a refresh operation on the page or a read reclaim operation on a block including the page, wherein the controlling the memory device to selectively perform the refresh operation on the page only when an error correction decoding operation performed to correct an error in the read data passed.

22. An operating method of a controller, the operating method comprising:

providing first data, which has been successfully read from a physical page, to a host;

controlling a memory device to read second data from a least significant page corresponding to the physical page; and controlling, based on difference between the first and second data, the memory device to selectively perform a refresh operation on the physical page or a read reclaim operation on a block including the physical page, wherein the controlling the memory device to selectively perform the refresh operation on the physical page only when an error correction decoding operation performed to correct an error in the first read data passed.

23. An operating method of a controller, the operating method comprising:

providing read data, which has been successfully read from a page, to a host;

controlling a memory device to read block data from two or more pages in a block including the page;

detecting a number of error bits in the block data; and controlling, based on the number of error bits detected in the block data, the memory device to selectively perform a refresh operation on the page or a read reclaim operation on the block, wherein the controlling the memory device to selectively perform the refresh operation on the physical page only when an error correction decoding operation performed to correct an error in the read data passed.

* * * * *